United States Patent
Yong et al.

(10) Patent No.: US 11,585,916 B2
(45) Date of Patent: *Feb. 21, 2023

(54) RANGING USING BEAMFORMING ANTENNA WEIGHT VECTORS AND SECURE RANGING PACKET WITH PHASE TRACKING

(71) Applicant: Apple Inc., Cupertino, CA (US)

(72) Inventors: Su Khiong Yong, Palo Alto, CA (US);
Mithat C. Dogan, San Jose, CA (US);
Mingguang Xu, San Jose, CA (US);
Anuj Batra, Mountain View, CA (US);
Keangpo R. Ho, San Jose, CA (US);
Akira Yamanaka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 16/383,119

(22) Filed: Apr. 12, 2019

(65) Prior Publication Data

US 2020/0003890 A1    Jan. 2, 2020

Related U.S. Application Data

(60) Provisional application No. 62/692,351, filed on Jun. 29, 2018.

(51) Int. Cl.
*G01S 13/84*      (2006.01)
*H04W 12/63*    (2021.01)
(Continued)

(52) U.S. Cl.
CPC .............. *G01S 13/84* (2013.01); *G01S 13/18* (2013.01); *H04L 27/2607* (2013.01);
(Continued)

(58) Field of Classification Search
CPC combination set(s) only.
See application file for complete search history.

(56) References Cited

U.S. PATENT DOCUMENTS 7,747,285 B2 *  6/2010  Lozano ............... H04B 7/0619
                                                    455/67.11
10,917,804 B2 *  2/2021  Yong .................... H04B 7/0617
(Continued)

FOREIGN PATENT DOCUMENTS

CN          101399607 A      4/2009
CN          104115021 A      10/2014
(Continued)

OTHER PUBLICATIONS

Patent Search Report for Chinese Patent App. No. 201910472660.2, 6 pages with translation, dated Oct. 24, 2022.
(Continued)

*Primary Examiner* — Dominic E Rego
(74) *Attorney, Agent, or Firm* — Sterne, Kessler, Goldstein & Fox P.L.L.C.

(57) ABSTRACT

Some embodiments enable secure time of flight (SToF) measurements for wireless communication packets that include secure ranging packets with zero padded random sequence waveforms, including at higher frequency bands (e.g., 60 GHz) and in non-line of sight (NLOS) scenarios. Some embodiments provide a flexible protocol to allow negotiation of one or more security parameters and/or SToF operation parameters. For example, some embodiments employ: phase tracking and signaling to support devices with phase noise constraints to mitigate phase noise at higher frequencies; determining a number of random sequences (RSs) used for SToF to support consistency checks and channel verification; additional rules supporting sub-phases of the SToF operation; and/or determining First
(Continued)

Path (FP), Sub-Optimal, and/or Hybrid path AWV modes and the pre-conditioning usage of these modes.

20 Claims, 18 Drawing Sheets

(51) Int. Cl.
*H04W 28/18* (2009.01)
*H04L 27/26* (2006.01)
*H04W 28/24* (2009.01)
*G01S 13/18* (2006.01)

(52) U.S. Cl.
CPC ......... *H04L 27/2613* (2013.01); *H04W 12/63* (2021.01); *H04W 28/18* (2013.01); *H04W 28/24* (2013.01)

(56) References Cited

U.S. PATENT DOCUMENTS

| | | | |
|---|---|---|---|
| 10,951,598 B2* | 3/2021 | Shattil | H04L 63/061 |
| 2004/0246175 A1 | 12/2004 | Thomas | |
| 2007/0159957 A1 | 7/2007 | Ljung et al. | |
| 2010/0178884 A1 | 7/2010 | Nassiri-Toussi et al. | |
| 2011/0105032 A1* | 5/2011 | Maruhashi | H04B 7/0617 455/59 |
| 2013/0069822 A1 | 3/2013 | Wu et al. | |
| 2016/0149633 A1 | 5/2016 | Sanderovich et al. | |
| 2016/0359230 A1 | 12/2016 | Wang et al. | |
| 2016/0381504 A1 | 12/2016 | Sommer | |
| 2017/0029107 A1* | 2/2017 | Emami | G08G 5/0069 |
| 2018/0062902 A1* | 3/2018 | Gagiev | H04L 27/2666 |
| 2019/0158156 A1* | 5/2019 | Da Silva | H04B 7/0421 |
| 2021/0028850 A1* | 1/2021 | Elliott | H04B 7/0695 |

FOREIGN PATENT DOCUMENTS

| | | |
|---|---|---|
| CN | 106809250 A | 6/2017 |
| CN | 107425953 A | 12/2017 |
| CN | 107710791 A | 2/2018 |
| JP | 2010-130186 A | 6/2010 |

OTHER PUBLICATIONS

Notification of the First Office Action for Chinese Patent App. No. 201910472660.2, 6 pages with translation, dated Nov. 1, 2022.

* cited by examiner

Pre-condition: Link has been established between Initiator and Responder and the Best Path (BP) antenna weight vectors (AWVs) are determined Beamforming (BF) Phase
a. First Path BF
b. Best Path BF Update
— 310

Setup and Negotiation Phase
a. Operation parameters (BW, schedule, channel, phase tracking, FP/BP AWV)
b. Security parameters (Salt and share key, # of RSs)
— 320

Protection Establishment Phase
a. RTS/CTS in first path direction
b. RTS/CTS in best path direction
— 330

Secure Measurement Phase
a. preamble + header + data using BP-AWV, and TRN field using FP-AWV, OR
b. Entire secure ranging packet using FP-AWV, OR
c. Entire secure ranging packet using Sub-Optimal AWV
— 340

Termination Phase
a. Initiator terminates session
b. Responder terminates session
— 350

| Category | Public Action | Trigger | LCI Measurement Request (optional) | Location Civic Measurement Request (optional) | Fine Timing Measurement Parameters (optional) | EDMGz Specific Parameters (optional) 910 |
|---|---|---|---|---|---|---|
| 1 | 1 | 1 | variable | variable | variable | variable |

Octets

| Element ID 912 | Length 914 | Element ID Extension 916 | Subset of EDMG Capabilities 920 | Secure Ranging Parameters subelement (optional) 930 | EDMG Direction Measurement subelement (optional) 918 | TBD | TBD |
|---|---|---|---|---|---|---|---|
| 1 | 1 | 1 | TBD | variable | variable | variable | variable |

Octets

| BW 922 | Antenna 924 | Reserved 926 | TBD |
|---|---|---|---|
| TBD | 1 | | TBD |

Octets

| | Subelement ID 932 | Length 934 | Ranging Operation Parameters 940 | Secure Ranging Parameters 950 |
|---|---|---|---|---|
| Octets | 1 | 1 | TBD | 96 |

| | Number of Random Sequences 942 | Reserved 944 | Phase Tracking 946 | First/Sub-Optimal AWV 948 | Reserved 949 |
|---|---|---|---|---|---|
| Bits | 4 | 4 | 1 | 2 | 5 |

| Secret Key 952 | Salt 956 |
|---|---|
| 64 | 32 |

*FIG. 9F*

RANGING USING BEAMFORMING ANTENNA WEIGHT VECTORS AND SECURE RANGING PACKET WITH PHASE TRACKING

CROSS-REFERENCE TO RELATED APPLICATIONS

This application claims benefit of U.S. Application No. 62/692,351, filed on Jun. 29, 2018, entitled, Apparatus and Method for Transmitting a Secure Ranging Packet with Phase Tracking, which is incorporated herein by reference in its entirety.

BACKGROUND

Field

The described embodiments generally relate to enabling secure time of flight (SToF) measurements for wireless communication packets.

Related Art

Wireless communication systems that utilize predictable and repetitive structures (e.g., Cyclic Prefix Orthogonal Frequency-Division Multiplexing (CP-OFDM) or Cyclic Prefix-based Single Carrier (CP—SC) and Golay sequences) are vulnerable to attacks that can result in poor quality and/or disruption of service. For example, a hacker device may be used by an entity that is not engaged in secure ranging but attempts to tamper with time of arrival (ToA) measurement/measurement reports exchanged by entities engaged in secure ranging. A hacker device can listen to a wireless transmission—e.g., from an initiator station to a responder station—that utilizes a cyclic prefix (CP). The hacker device may transmit interloper signals that are received at the responder station that result in incorrect calculations of ranges (e.g., distances) between the initiator and responder stations. Range calculations can be based on round trip time (RTT) derived from a time of arrival (ToA) and a time of departure (ToD). ToA can be derived from a multi-path channel estimation based on pilots. Thus, channel estimates that rely on a repetitive structure are vulnerable to adversarial attacks. In addition, a variety of devices communicating via legacy 802.11 technologies may exist within the same frequency bands, and may interfere with communications for secure ranging. Further, solutions for determining secure time of flight (SToF) measurements for wireless communication packets at higher frequency bands (e.g., 60 GHz) and in non-line of sight (NLOS) conditions present challenges.

SUMMARY

Some embodiments include an electronic device, method, and computer program product for enabling secure time of flight (SToF) measurements for wireless communication packets that include secure ranging packets with zero padded random sequence waveforms, including at higher frequency bands (e.g., 60 GHz) and in non-line of sight (NLOS) scenarios. Some embodiments provide a flexible protocol to allow negotiation of various security parameters and SToF operation parameters. For example, some embodiments employ: phase tracking and signaling to support devices with phase noise constraints to mitigate phase noise at higher frequencies; determining a number of random sequences (RSs) used for SToF to support consistency checks and channel verification; additional rules supporting sub-phases of the SToF operation; and/or determining First Path Beamforming (FPBF) antenna weight vector (AWV) mode, Sub-optimal AWV mode and/or Hybrid path AWV modes and the pre-conditioning usage of these modes.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 3 illustrates an example method for Secure Fine Time Measurement (FTM), according to some embodiments of the disclosure.

FIGS. 9A-9F illustrate an example Secure FTM request frame format and field formats, according to some embodiments of the disclosure.

Figure 1:
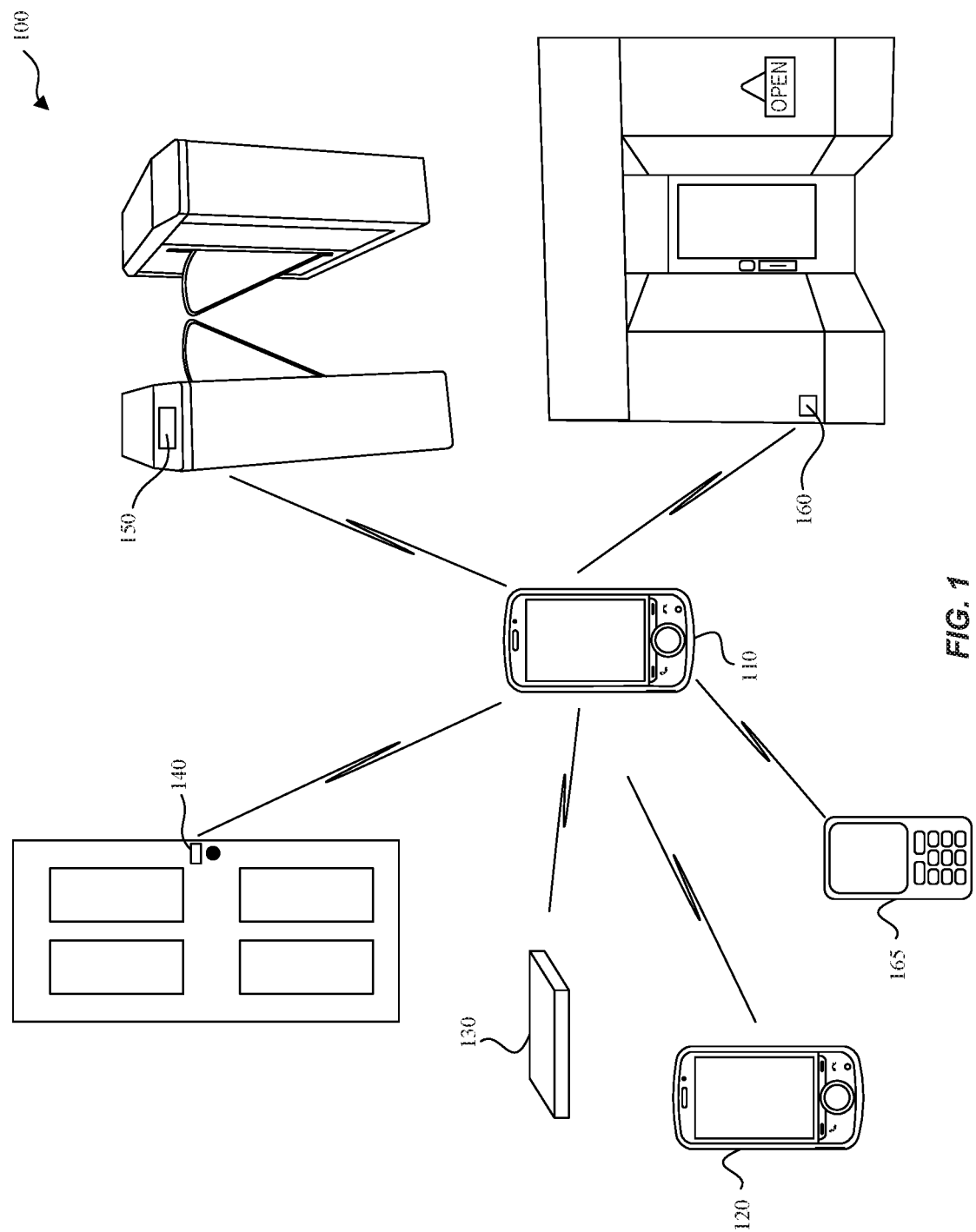
FIG. 1 illustrates an example system implementing flexible secure time of flight measurements, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Wireless communication packets may include secure ranging packets with zero padded random sequence waveforms to address cyclic prefix (CP)-Replay attacks. A zero padded random sequence waveform may be in the form of a training (TRN) subfield, for example. At higher frequency bands, phase noise may lead to performance degradation and secure time of flight (SToF) range measurements may be inaccurate, preventing high precision ranging use cases. The first arrival path (FAP) is the propagation path between a transmitter and a receiver which is estimated to have a shortest time of flight (ToF). In non-line of sight (NLOS) scenarios the FAP may be much weaker (e.g., −35 dB to −30 dB lower than that of the strongest path.) The FAP may be too weak to be estimated. Since the FAP is used in determining high precision range or distance of an electronic device from another electronic device, the SToF range measurements may be inaccurate.

To address the above problems, some embodiments provide a flexible protocol to allow negotiation of various security parameters and SToF operation parameters. For example, some embodiments employ: phase tracking and signaling to support devices with phase noise constraints to mitigate phase noise at higher frequencies; determining a number of random sequences (RSs) used for SToF to support consistency checks and channel verification; additional rules supporting sub-phases of the SToF operation; and/or determining First Path (FP), Sub-Optimal, and/or Hybrid path AWV modes and the pre-conditioning usage of these modes.

Some embodiments enable communicating wireless devices to collaborate with each other and utilize waveforms that enable secure channel estimation, which is important to secure ranging. To protect against a repetitive replay attack, some embodiments include Single Carrier Physical Layer (SC—PHY) waveforms and/or interpolated OFDM waveforms that do not include a repeatable or predictable structure.

Before a ranging process begins, information (e.g., a random sequence (RS), and/or a guard interval (GI) to be used for phase tracking) may be generated and securely exchanged from one wireless system to another wireless system. The information exchanged supports the secure waveform structure 1130 that one wireless system transmits in an EDMGz packet 1110 (e.g., a secure ranging packet) to another when the ranging process begins. The EDMGz packet 1110 (containing the secure waveform structure 1130) received and the information previously exchanged (e.g., RS or GI) by the wireless systems enable a receiving wireless system to securely determine channel estimation (e.g., determine channel estimation without an interloper transmission that is not an authentic FAP in a multi-path channel between the wireless systems). Thus, the wireless systems can securely determine the distance between each other.

In addition, devices supporting legacy 802.11 systems may also receive the secure ranging packet that is compatible with the legacy 802.11 systems. For example, legacy 802.11 systems may not support waveform systems for secure channel estimation, and may include IEEE 802.11 technologies prior to IEEE 802.11az. A device supporting legacy 802.11 systems that receives the secure ranging packet can determine the duration of the secure ranging packet and hence determine a time duration for deferring channel access. This allows the wireless systems engaged in ranging to gain control of the channel. The secure ranging packet includes secure ranging packet structures that are compatible with legacy 802.11 systems.

FIG. 1 illustrates an example system 100 implementing waveform systems for flexible secure time of flight (SToF) measurement, according to some embodiments of the disclosure. Example system 100 is provided for the purpose of illustration only and is not limiting of the disclosed embodiments. System 100 may include but is not limited to wireless communication devices 110, 120, vehicular transponder device 130, entry transponder device 140, ticket entry device 150, and proximity detection device 160. Other devices that may benefit from some or all of the embodiments—which are not shown in FIG. 1 for simplicity purposes—may include other computing devices including but not limited to a smart watch, laptops, desktops, tablets, personal assistants, routers, monitors, televisions, printers, household devices (e.g., thermostat), and appliances. Example uses may include access to a device or entryway once in proximity to the device or entryway. A device carried by a user typically initiates a ranging process with a device that responds. In system 100, wireless communication device 110 is depicted as an initiating device, but other initiating devices (not shown) include but are not limited to a smart watch, tablet, personal assistant, smart phone, and a laptop.

When wireless communication device 110 is in proximity (e.g., meters) to vehicular transponder device 130 or entry transponder device 140, some embodiments may enable a corresponding car door or other entry (e.g., entry of a door to a house, an office, a building, or access to a laptop computer) to be unlocked or opened. Likewise, when wireless communication device 110 is in proximity of ticket entry device 150, some embodiments allow a ticket (e.g., a concert ticket, a metro rail ticket, or a sport event ticket) associated with wireless communication device 110 to be recognized, validated, and allow a ticket holder (via wireless communication device 110) entry to the venue. Ticket entry device 150 may include other implementations including but not limited to a turnstile that permits entry, or an automatic gate that unlocks or opens. Proximity detection device 160 may detect a potential customer with wireless communication device 110 near a store front and transmit a promotional coupon or advertisement to wireless communication device 110 to entice the potential customer to visit the store. Likewise, wireless communication device 120 of a first user may recognize when wireless communication device 110 of a second user is in proximity and send an invitation to wireless communication device 110 to invite the second user to meet (e.g., helps friends and family members find each other). In another example (not shown), settings of a household device may be adjusted to preferences associated with or stored on wireless communication device 110 as wireless communication device 110 comes into proximity. In another example, a leash tag (not shown) may be a removable device attached to a pet collar or clothing of a wandering toddler where secure communications between the leash tag and wireless communication device 110 result in an alarm notification on wireless communication device 110 when the leash tag exceeds a configurable distance threshold from wireless communication device 110.

The above wireless communication devices can be portable or mobile and can determine relative positions and/or distances with each other. Some wireless devices may be stationary (e.g., proximity detection device 160) and may determine absolute positions or geographic locations.

System 100 may also include wireless communication device 165 that utilizes legacy 802.11 technologies that may not support waveform structures for secure channel estimation. When wireless communication device 165 receives the secure ranging packet that includes the waveform structures, wireless communication device 165 can determine the duration of the secure ranging packet (e.g., a length of the secure ranging packet) and defer access by communication device 165 to that channel for at least the duration. The duration of the secure ranging packet may be determined from one or more fields of the preamble of the secure ranging packet structure.

Figure 2:
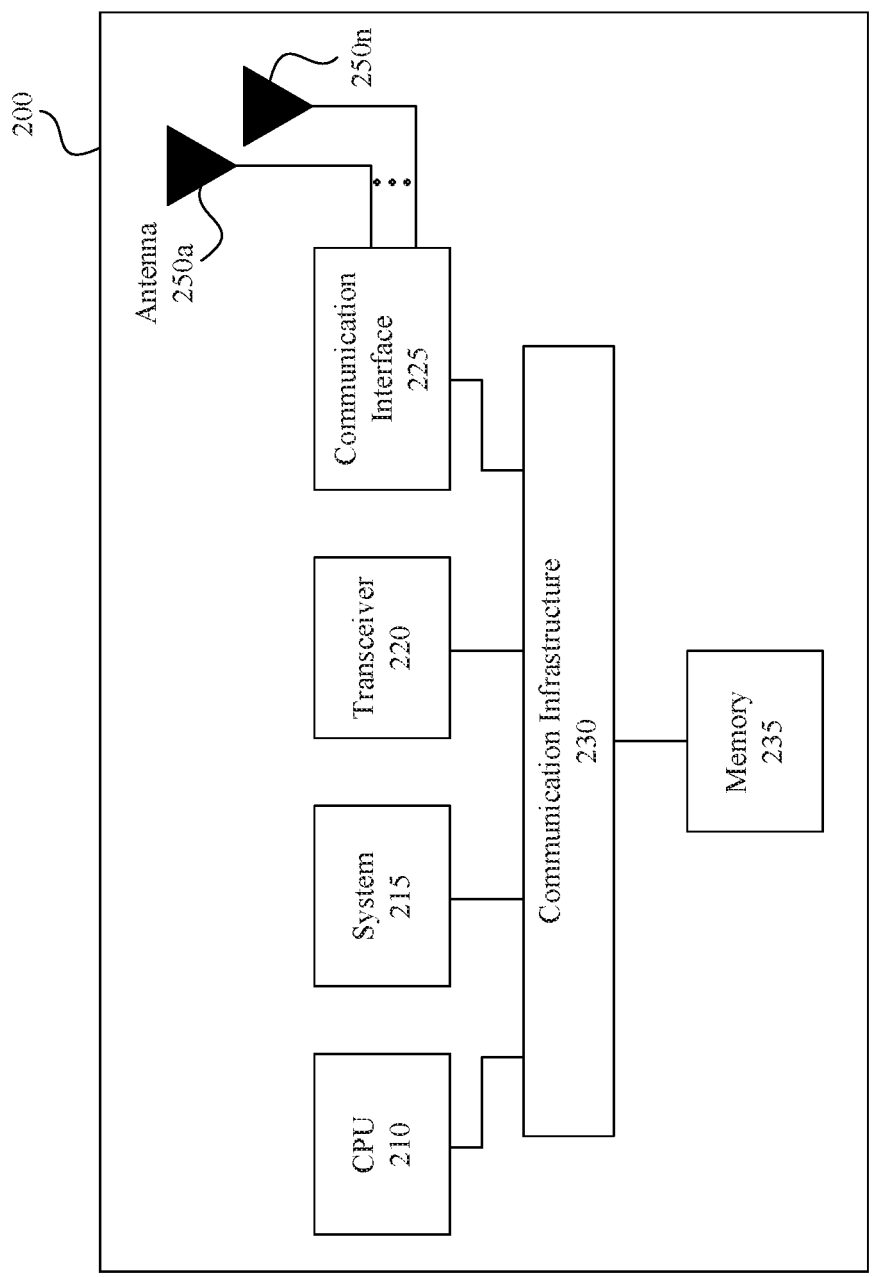
FIG. 2 illustrates a block diagram of an example wireless ranging system with secure time of flight measurements, according to some embodiments of the disclosure.

FIG. 2 is a block diagram that illustrates an example wireless ranging system 200 with secure channel estimation, according to some embodiments of the disclosure. System 200 may be any of the electronic devices (e.g., 110, 120, 130, 140, 150, and/or 160) of system 100. System 200 may include central processing unit (CPU) 210, transceiver 220, communication interface 225, communication infrastructure 230, memory 235, and one or more antennas 250*a*-250*n*. Transceiver 220 transmits and receives communications signals including secure ranging packet structures that include waveforms supporting flexible SToF measurements according to some embodiments, and may be coupled to antennas 250*a*-*n*. Communication interface 225 allows system 200 to communicate with other devices that may be wired and/or wireless. Communication infrastructure 230 may be a bus. Memory 235 may include random access memory (RAM) and/or cache, and may include control logic (e.g., computer software) and/or data. Antennas 250*a*-250*n* may include antennas of the same and/or different types.

Figure 16:
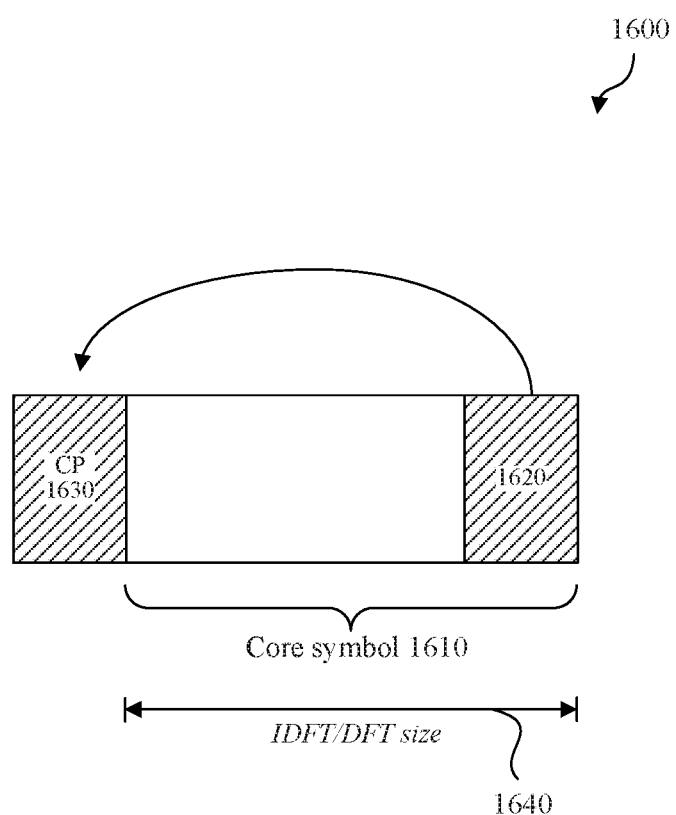
FIG. 16 illustrates an example symbol of a repetitive structure waveform.
Figure 17:
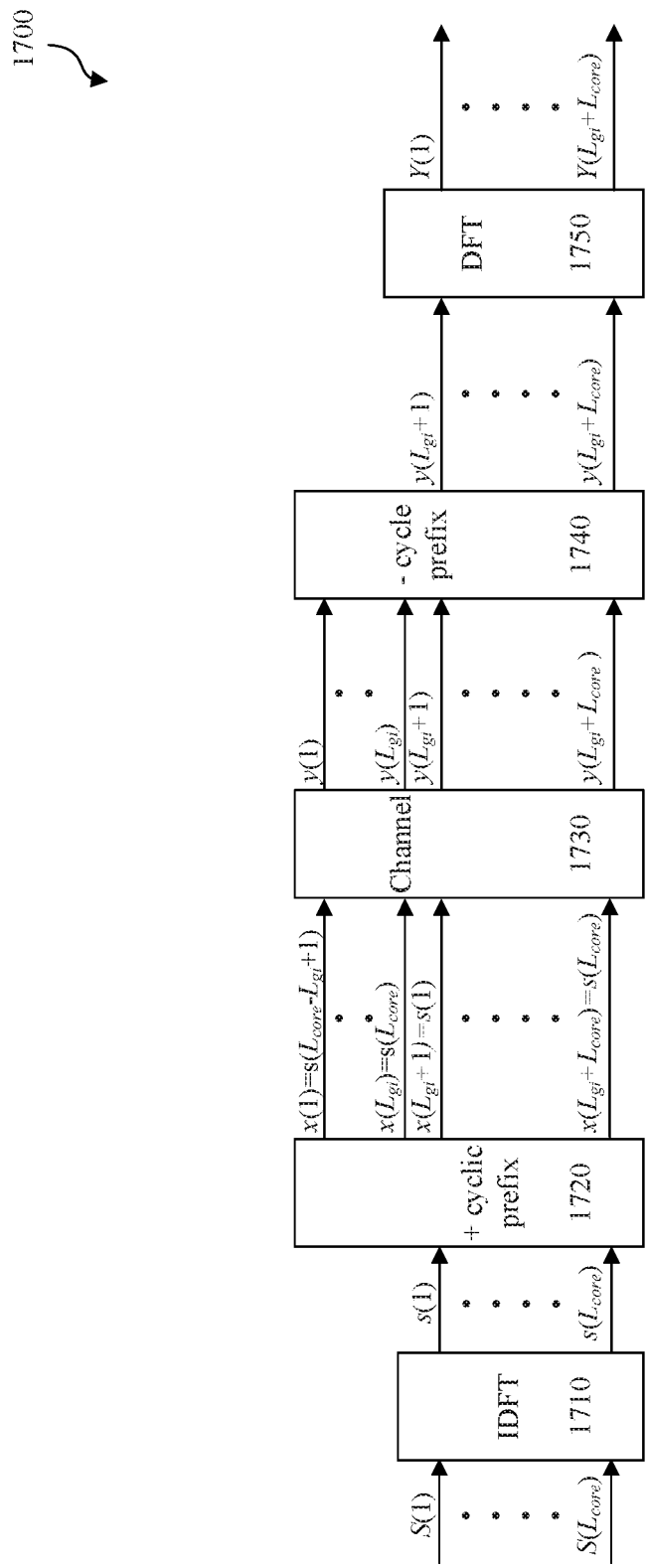
FIG. 17 illustrates an example transmission and reception scheme of a Cyclic Prefix (CP) OFDM waveform.

FIGS. 16 and 17 are example illustrations to demonstrate how wireless communication systems utilizing a known and/or repetitive symbol structure are vulnerable to a hacker device. FIG. 16 illustrates an example symbol 1600 of a repetitive structure waveform. In this example, symbol 1600 is a Cyclic Prefix (CP) OFDM waveform. Symbol 1600 includes a core symbol 1610, an end 1620 (e.g., the last 25% of core symbol 1610), and a CP 1630. The size of an Inverse Discrete Fourier Transform (IDFT)/Discrete Fourier Transform (DFT) pair that transmits and receives symbol 1600 is equal to the length of core symbol 1610. Symbol 1600 is a known structure and a hacker device can readily listen in and begin recording portions of symbol 1600. Once the repeated end 1620 is detected, the hacker device can send an interloper transmission of symbol 1600 with a timing advance. When the interloper transmission of symbol 1600 is received before any authentic wireless transmission, the receiver may interpret the interloper transmission as a FAP of the symbol 1600, use that interloper transmission FAP to determine an incorrect Time of Arrival (ToA), and use that incorrect ToA to consequently calculate an incorrect range with respect to the system with which the receiver is communicating (e.g., not the hacker device). Thus, a hacker device can tamper with timing measurements/reports, resulting in incorrect channel estimation and incorrect range calculation. This incorrect channel estimation can cause security issues. For example, due to the interloper transmission, vehicle transponder device 130 of FIG. 1 may unlock or open doors when wireless communications device 110 is farther away from the vehicle than intended (e.g., 50 m). A similar attack may be applied to Cyclic Prefix-based Single Carrier (CP—SC) as well (e.g., an attacker can recognize a core symbol and transmit an interloper transmission with timing advance, and an early fake path can be created which eventually results in incorrect range estimation.)

FIG. 17 illustrates an example transmission and reception scheme 1700 of a CP OFDM waveform such as symbol 1600. As a convenience and not a limitation, FIG. 17 will be described with reference to the elements of FIG. 16. Scheme 1700 includes an IDFT 1710, a cyclic prefix adder 1720, a channel 1730, a cyclic prefix subtractor 1740, and a DFT 1750. The size of IDFT 1710 and DFT 1750 are both equal to the length of core symbol 1610 as noted by IDFT/DFT size 1640. Since CP 1630 is known to be equal to end 1620, and end 1620 is known to be 25% of core symbol 1610, a hacker device can recognize core symbol 1610 and transmit an interloper transmission. The interloper transmission may be the FAP and thus the interloper transmission will result in an incorrect range determination.

To protect against an interloper transmission that can tamper with ranging/timing measurements and/or reports, embodiments include securely exchanging information between wireless systems before a ranging process begins. The information exchanged are known to the wireless systems involved in the ranging process but not known to other entities. When the devices are in proximity and the ranging process begins, the wireless systems exchange secure ranging waveforms that do not include a repetitive and/or predictable structure (e.g., Cyclic Prefix Orthogonal Frequency-Division Multiplexing (CP-OFDM) and Golay sequences). An example of a secure ranging packet with secure ranging waveform is shown in FIG. 11.

Figure 11:
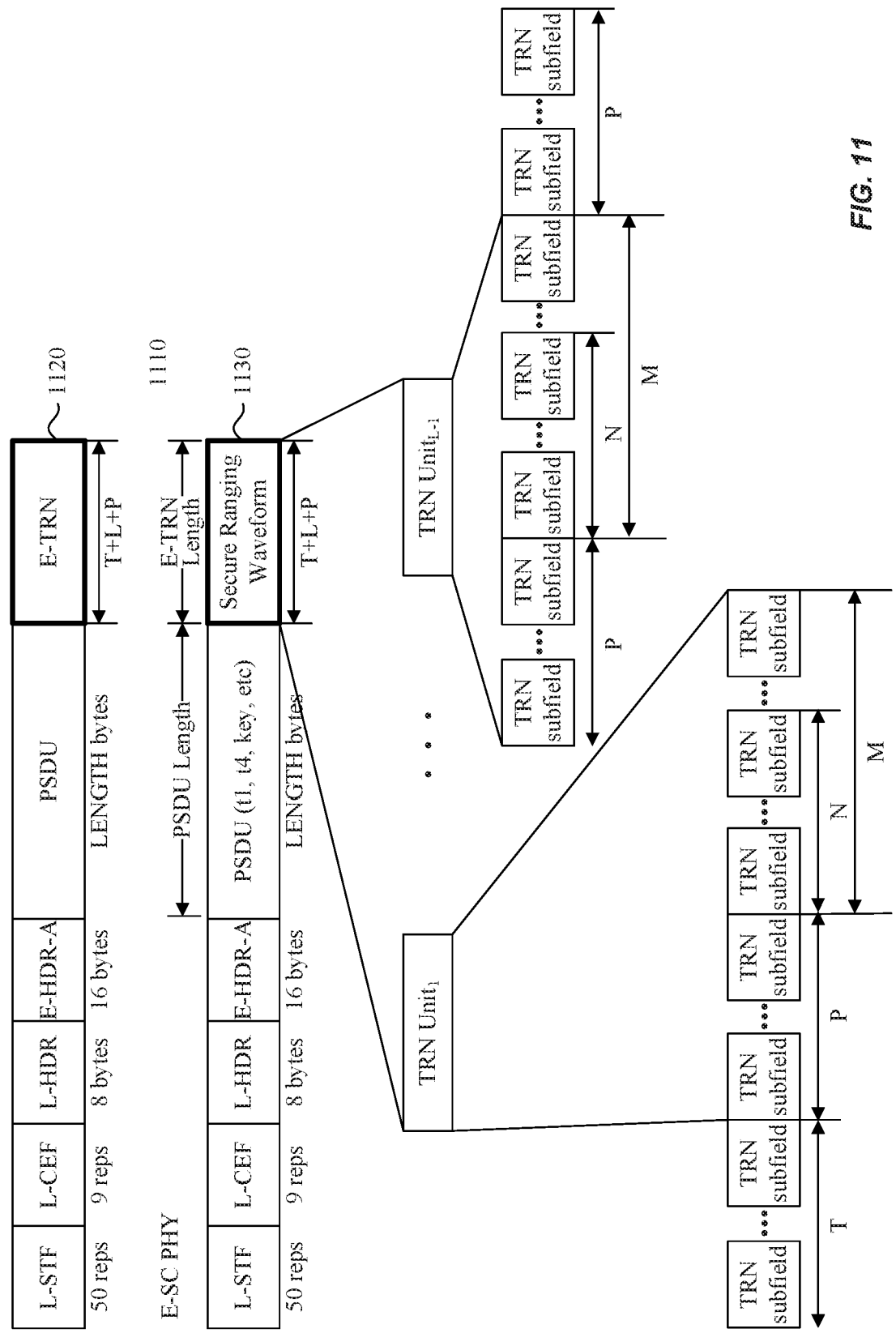
FIG. 11 illustrates an example enhanced directional multi gigabit z (EDMGz) packet for SToF measurements, according to some embodiments of the disclosure.

FIG. 11 illustrates an example enhanced directional multi gigabit z (EDMGz) packet 1110 for SToF measurements, according to some embodiments of the disclosure. EDMGz indicates support for IEEE 802.11az secure ranging operation over EDMG devices. In other words, an EDMGz device is an EDMG device that is 802.11az capable for some, if not all, 802.11az features. EDMGz packet 1110 is used to perform secure ranging and enables the calculation of SToF.

Enhanced directional multi gigabit (EDMG) training (TRN) (E-TRN) field 1120 is used in IEEE 802.11ay ranging packet 1100 for determining the best path (BP) received at a receiver, where the BP is based on the signal path that provides the best signal-to-noise (S/N) ratio at the receiver. The TRN subfields of E-TRN 1120 are used for training to obtain the BP beamforming (BF) (BPBF) AWV. But when an IEEE 802.11ay ranging packet 1100 transmitted using the BPBF AWV is received, the E-TRN field 1120 may not have a strong enough S/N ratio to be recoverable. This may be problematic for embodiments that support SToF measurements by re-purposing the E-TRN field 1120 as secure ranging waveform field 1130. For example, if an EDMGz packet 1110 transmitted using the BP AVW is received, secure ranging waveform field 1130 may not be recoverable. Thus, SToF measurements and hence applications depending on SToF measurements may not be accurate.

To address the above problems, some embodiments enable the recovery of the E-TRN field 1120 or a secure ranging waveform field 1130 received by a receiver. For example, a receiver with IEEE 802.11ay hardware that receives (E-TRN) field 1120 in IEEE 802.11ay ranging packet 1100 may use a different algorithm to determine a first path (FP) received at a receiver, where the FP is a signal path among many signal paths received, where the FP signal path has the shortest FAP compared to the FAP of the many signal paths received. The TRN subfields of E-TRN 1120 are used for training to obtain the FP Beamforming (BF) (FPBF) AWV. A transmitter may transmit EDMGz packet 1110 using a FPBF AWV. Some embodiments enable a receiver of the EDMGz packet 1110 transmitted with a FPBF AWV to accurately recover secure ranging waveform field 1130, and determine a more accurate SToF compared to the same EDMGz packet 1110 being transmitted with a BPBF AWV.

EDMGz packet 1110 reuses the format of an IEEE 802.11ay ranging packet 1100, so that IEEE 802.11 hardware may be reused, but with a different algorithm to determine SToF measurements (e.g., based on a FP calculation rather than a BP calculation). EDMGz packet 1110 may be used to perform secure ranging and enables the calculation of SToF. The first four fields, L-STF, L-CEF, L-HDR, and E-HDR-A, are used to enable co-existence with IEEE 802.11ad/11ay operation. The PLCP service data unit (PSDU) field contains the payload of the ranging operation such as timestamps (e.g., Time of Arrival, Time of Departure), dialog token, etc.

Figure 12A:
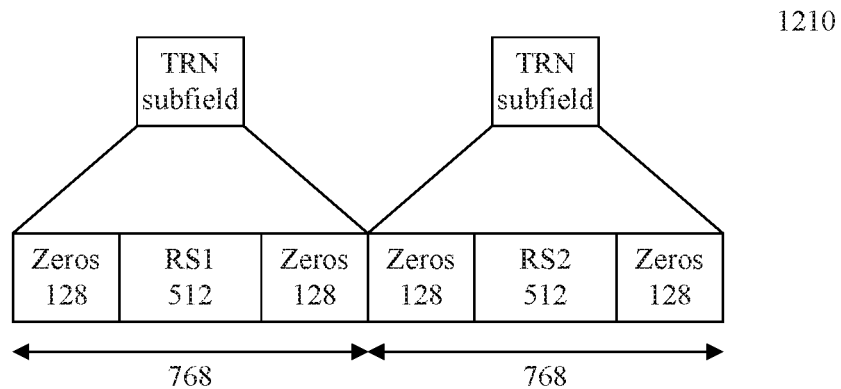
FIGS. 12A-C illustrate options for secure ranging waveforms, according to some embodiments of the disclosure.
Figure 12B:
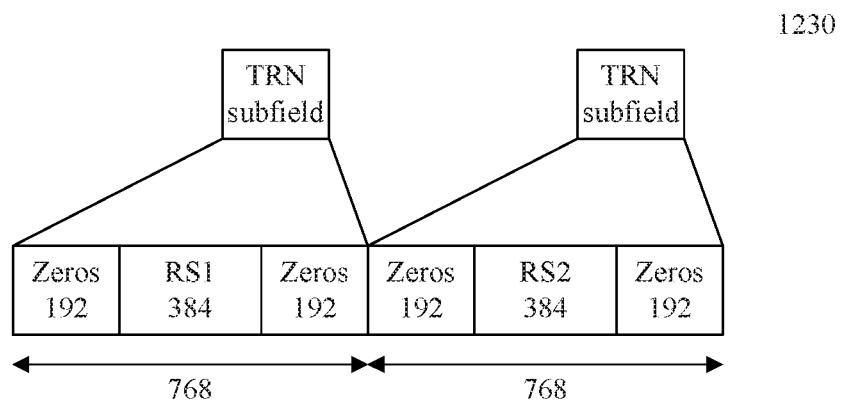
Figure 12C:
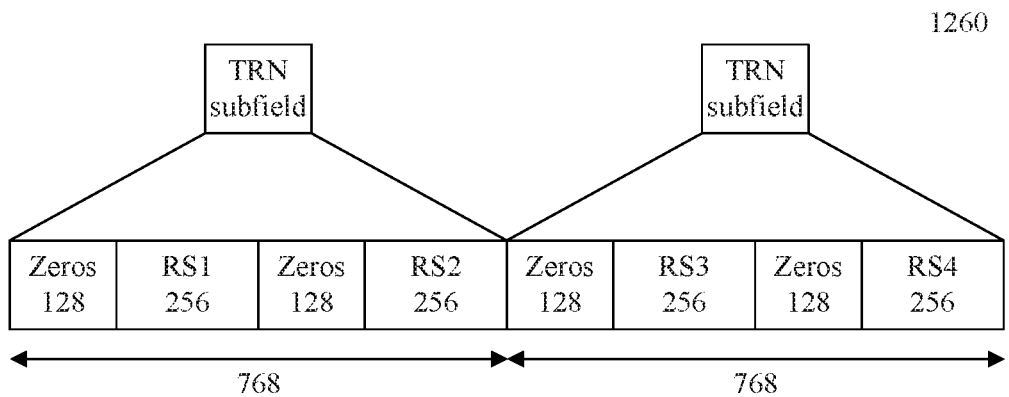

In some embodiments a TRN subfield format includes a zero-padded random sequence (RS) waveform (e.g., zeros+ random sequence as shown in FIGS. 12A-12C). The TRN subfields noted by T represent the time needed to switch from processing data (e.g., the PSDU) to switch to training to obtain the FP, the TRN subfields noted by P are used for channel estimation, and the values for N and M may be set to zero (e.g. the N and M subfields may not be included).

While SToF measurements over a TRN subfield with a zero-padded RS waveform addresses CP-Replay attacks, at higher frequency bands like 60 GHz, phase noise may lead to performance degradation. For example, the phase noise may affect the determination of secure time of flight (SToF) measurements resulting in inaccurate range measurements that negatively impact high precision ranging use cases as described above.

FIGS. 12A-C illustrate options 1210, 1230, and 1260 for secure ranging waveforms 1130, according to some embodiments of the disclosure. A TRN subfield comprises 768 chips that may be arranged in various combinations of zeros and random sequences as shown in options 1210, 1230, and 1260. The size of the FFT receiver, overhead %, and performance vary based on each option as shown below in Table 1. Option 1210 includes TRN subfields with 768 chips comprising 128 prefix zeros, RS of length 512 where RS1 and RS2 are random sequences that are independent from each other and randomly generated, and 128 postfix zeros. Because of the FFT size 1024 at the receiver, Option 1210 may be difficult to implement. Option 1230 includes TRN subfields with 768 chips comprising 192 zeros, RS1 and RS2 each of length 384, and 192 postfix zeros. Option 1260 includes TRN subfields with 768 chips comprising 128 prefix zeros, RS1 of length 256 followed by 128 zeros and a RS2 of length 256. A similar TRN subfield is shown with 768 chips including 128 prefix zeros, RS3 of length 256 followed by 128 zeros and a RS4 of length 256. Other options for TRN subfield configurations may be possible.

Figure 13:
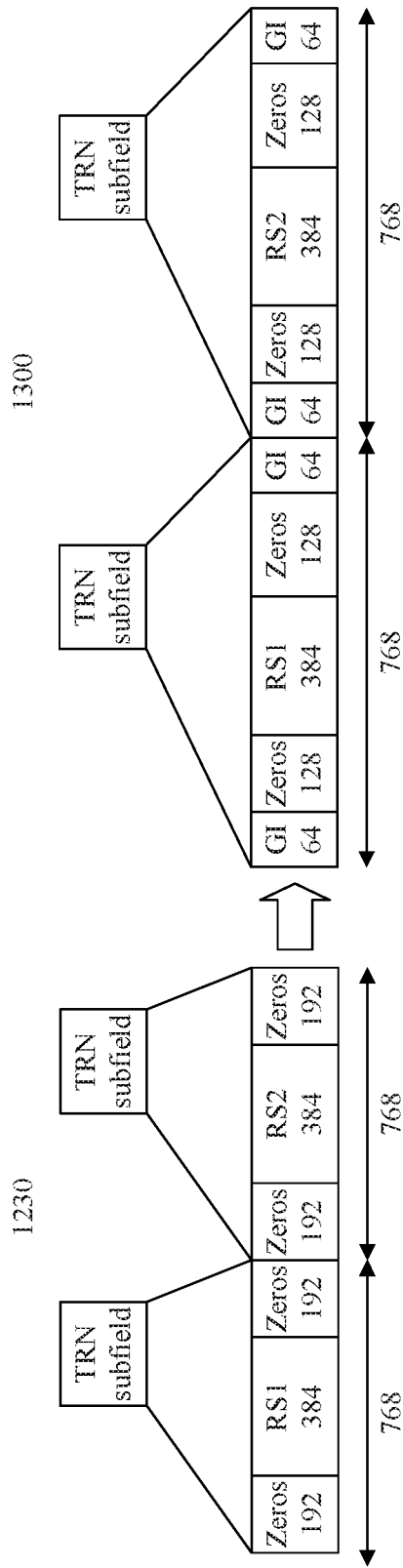
FIG. 13 illustrates an example zero-padded random sequence waveform with phase tracking, according to some embodiments of the disclosure.

To support devices with phase noise constraints to mitigate phase noise at higher frequencies, some embodiments employ phase tracking and corresponding signaling. FIG. 13 illustrates an example zero-padded RS waveform 1300 with phase tracking, according to some embodiments of the disclosure. As an example, the prefix zeros 192 and the postfix zeros 192 of Option 1230 may be modified so that the first and last 64 chips may be used for phase tracking at the beginning and end of a TRN subfield as shown in zero-padded RS waveform 1300 with phase tracking. Given a maximum channel delay of 128 chips, the first 64 chips and the last 64 chips may each be a guard interval (GI) that has no relation to the random sequence of 384 chips. Thus, the Rx FFT size for option 1230 may be 512 (e.g., 384+64+64). A GI is a known sequence of chips (known to both transmitter and receiver) used for cross correlation by a receiver to adjust SToF measurements due to phase noise. Other configurations may be possible.

For example, after phase tracking has been negotiated and/or indicated, a receiver may recognize the first GI as a pilot symbol in the TRN subfield that marks the start of a random sequence and the second GI marks the end of the random sequence. The GIs may be used to determine a presence of a phase shift due to phase noise and carrier frequency offset may be determined. If a phase shift is determined, the effects of the phase shift due to phase noise may be removed, thus improving the accuracy of the SToF measurements.

A receiving device may receive an indication that phase tracking is being used, and the receiving device can prepare to receive the first and second 64 chips of the respective GIs, use the GIs received to calculate the phase shift, and then correct and/or remove the effects of phase shift. As an example the GI may be fixed (e.g., use an existing version in IEEE 802.11ad/ay specification). In some embodiments, there may be many different GIs to avoid pilot pollution and/or collision which may occur when common signals like a fixed GI are used by different transmitters. For example, a given transmitter may choose to use a particular signaled GI (e.g., Golay sequence 1) for an intended receiver. The given transmitter may indicate to the intended receiver that phase tracking is to be used as well as the particular GI, so that the intended receiver can prepare to receive the particular signaled GI in the chips corresponding to GIs received from the given transmitter. In some embodiments, the transmitter may select or randomly select a particular signaled GI and provide a corresponding GI code and/or GI index based on a codebook or table with an index, to inform the intended receiver of the particular signaled GI that the transmitter will be using. The intended receiver may receive the GI code and/or GI index, and adjust accordingly to expect receipt of the particular signaled GI. In some embodiments the trans-

TABLE 1

TRN Subfield Options

| Option | Rx FFT size | Overhead | Performance | Comments |
|---|---|---|---|---|
| 1210 | 1024 (minimally 640, can pad 384 zeros to 1024) | 33% | Acceptable | Difficult due to large size |
| 1230 (e.g., 1300 of FIG. 13) | 512 | 50% | Some degradation due to less non-zero signal | Can enable phase tracking |
| 1260 | 512 (can pad 128 zeros) | 33% | Can average across two RSs. | Less overhead | mitter may send the particular signaled GI selected in its entirety (e.g., an entire 64 bit sequence) to the intended receiver.

Figure 14A:
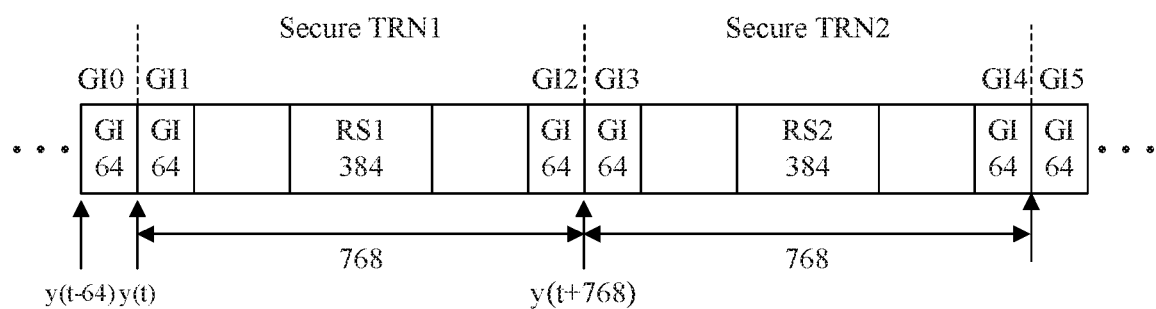
FIG. 14A illustrates an example zero-padded random sequence waveform with phase tracking of a received signal, according to some embodiments of the disclosure.

FIG. 14A illustrates example zero-padded random sequence waveform 1400 with phase tracking of a received signal, y(t), according to some embodiments of the disclosure. As an example, the received signal, y(t), may be a signal exchanged between communication device 110 as shown in FIG. 1 and communication device 120, vehicular transponder device 130, entry transponder device 140, ticket entry device 150, or proximity detection device 160. In a more detailed example, the received signal, y(t) may be signal (d1) or (d3) of FIG. 10 received by an Initiator device, or signals (d2) or (d4) received by a Responder device.

Figure 14B:
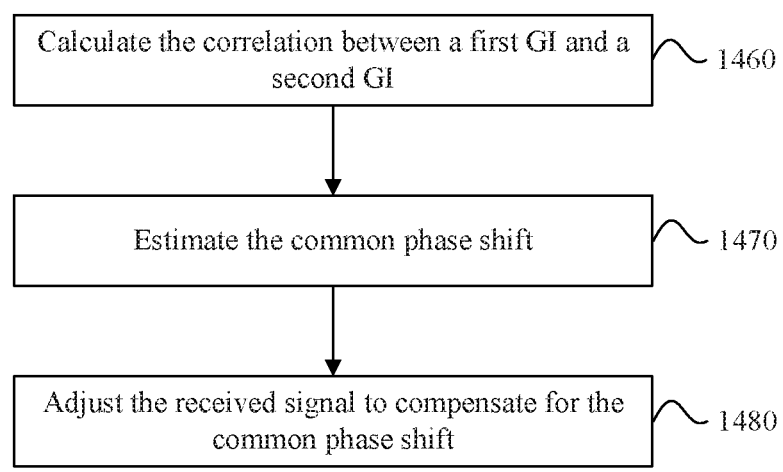
FIG. 14B illustrates an example method for phase tracking compensation, according to some embodiments of the disclosure.

In the examples, a receiver receives signal, y(t), that includes example zero-padded random sequence waveform 1400 with phase tracking, and compensates for phase noise and carrier frequency offset over a random sequence (e.g., RS1.) FIG. 14B illustrates an example method 1450 for phase shift compensation, according to some embodiments of the disclosure. Method 1450 may be performed by a system 200 of FIG. 2 and/or system 1500 of FIG. 15. A receiver receives example zero-padded random sequence waveform 1400 with phase tracking that includes Secure TRN1, Secure TRN2, and so on as shown in FIG. 14A. In a first example, method 1450 is described using GI1 and GI2, followed by a second example of method 1450 using GI0 and GI2.

Method 450 using GI1 and GI2

At 1460, a receiver calculates a correlation between GI1 and GI2 to estimate the phase difference between GI1 and GI2 as follows:

$$\text{corr}(GI1, GI2) = \sum_{i=t}^{t+63} y^*(i)y(i+704)$$

where y*(i) is the conjugate of y(i) and (i+704) indicates the start of GI2.

At 1470, the receiver estimates the common phase shift between GI1 and GI2:

$$\hat{\theta} = \tan^{-1}\left(\frac{\text{Im}\{\text{corr}(GI1, GI2)\}}{\text{Re}\{\text{corr}(GI1, GI2)\}}\right)$$

At 1480, the receiver adjusts the received signal, y(t), to compensate for the common phase shift at each sample to produce the adjusted received signal, ŷ(i):

$$\hat{y} = y(i) \cdot e^{-j\hat{\theta}\frac{i-t}{704}}, i = t+192, \ldots, t+704$$

The adjusted received signal, ŷ(i), may be used by the receiver for SToF calculations.

Method 450 Using GI0 and GI2

At 1460, a receiver calculates a correlation between GI0 and GI2 to estimate the phase difference between GI0 and GI2 as follows:

$$\text{corr}(GI0, GI2) = \sum_{i=t-64}^{t-1} y^*(i)y(i+768)$$

where y*(i) is the conjugate of y(i) and (i+768) indicates the start of GI2.

At 1470, the receiver estimates the common phase shift between GI0 and GI2:

$$\hat{\theta} = \tan^{-1}\left(\frac{\text{Im}\{\text{corr}(GI0, GI2)\}}{\text{Re}\{\text{corr}(GI0, GI2)\}}\right)$$

At 1480, the receiver adjusts the received signal, y(t), to compensate for the common phase shift at each sample to produce the adjusted received signal, ŷ(i):

$$\hat{y}(i) = y(i) \cdot e^{-j\hat{\theta}\frac{i-t+64}{768}}, i = t+192, \ldots, t+704$$

The adjusted received signal, ŷ(i), may be used by the receiver for SToF calculations.

In non-line of sight (NLOS) scenarios, a FAP may be much weaker (e.g., −35 dB to −30 dB lower than the strongest path.) The range may be an estimated range. Even if the first 5-fields of EDMGz packet 1110 (e.g., L-STF, L-CEF, L-HDR, E-HDR-A, and PSDU) use a best path beamforming (BPBF) antenna weight vector (AWV), there may be a large power drop in signal level in the secure ranging waveform field 1130 that is used for SToF measurements. To support the power imbalance, the automatic gain control (AGC) field may be adjusted to adapt to the signal power. But to support the large power drop using AGC field, the adjustment may take a relatively long time for the variable gain amplifier to settle down. The FAP may be too weak to be estimated. Consequently, the SToF and thus, high precision ranging applications may be negatively affected in NLOS scenarios.

To address the above problem, some embodiments enable flexibility in the negotiation of various security parameters and SToF operation parameters by including additional rules supporting sub-phases of the SToF operation in the secure fine time measurement (FTM) protocol. Examples of the additional phases include a beamforming (BF) operation phase that enables the determination and selection of various antenna weight vectors (AWVs) that enable high precision ranging use cases. The various AWVs may be used in the transmission of wireless communications in different modes: first path, sub-optimal path, and/or hybrid path AWV modes, and the pre-conditioning usage of these modes.

FIG. 3 illustrates an example method 300 for Secure Fine Time Measurement (FTM), according to some embodiments of the disclosure. As a convenience and not a limitation, method 300 may be described with regard to elements of FIGS. 1, 2, and FIG. 4 to FIG. 15. Method 300 may be performed by an Initiator and Responder devices that may include wireless ranging system 200 of FIG. 2 and/or computer system 1500. A pre-condition for method 300 includes a link being established between an Initiator station and a Responder station. The initiating station initiates method 300 by transmitting a beam refinement protocol (BRP) frame, and will be called the Initiator. An example BRP frame format may include IEEE 802.11ay ranging packet 1100. The station that receives the BRP frame will be called the Responder. An Initiator may be carried by a user. An example of an Initiator includes but is not limited to wireless communication device 110, a smart watch, tablet, personal assistant, smart phone, and a laptop. Initiator functions of method 300 may be performed by wireless ranging system 200 of FIG. 2 or computer system 1500 of FIG. 15. An example of a Responder includes but is not limited to wireless communication device 120, vehicular transponder device 130, entry transponder device 140, ticket entry device 150, and proximity detection device 160. Responder functions of method 300 may be performed by another wireless ranging system 200 or another computer system 1500.

During the establishment of the link between the Initiator and Responder a BPBF AWV is determined. For example, a packet transmitted with the BPBF AWV results in the signal path with the best S/N ratio at a receiver.

At 310, the beamforming (BF) operation phase, at sub-phase a, the Initiator and Responder perform BF operations to find the FPBF AWV, where the FP is the propagation path with a shortest FAP compared to the other propagation paths determined during the FPBF operation. The FAP is the propagation path between a transmitter and a receiver which is estimated to have a shortest time of flight. In line of sight (LOS) conditions, the FP is the LOS path. At sub-phase b, a determination can be made as to whether the BPBF information obtained during the pre-condition should be updated. The BPBF update may utilize the L-STF and L-CEF fields, for example, to determine whether the BPBF determined during pre-condition results in the best S/N ratio and is valid. If the BPBF determined during pre-condition is not valid (e.g., a better BPBF AWV is determined) then the BPBF information may be updated accordingly.

At 320, the setup and negotiation phase, the Initiator and Responder setup and negotiate operation parameters 320*a* and security parameters 320*b* between the Initiator and Responder. For example, during the negotiation of operation parameters 320*a*, the Initiator and Responder jointly decide the AWV modes of operation to be used during the secure measurement phase 340. The modes of operation may include: first path beamforming (FPBF) AWV mode, sub-optimal beamforming (BF) AWV mode, and hybrid path AWV mode. The modes may converge in a LOS scenario in which the BP is also the FP. When the Initiator indicates a mode of operation (e.g., FPBF AWV mode, sub-optimal AWV mode, hybrid path AWV mode), the Responder sets a corresponding mode of operation as well. The Initiator may also indicate whether phase tracking is to be used and if the Responder agrees, the Responder may prepare the receiver to receive guard intervals (GIs), an appropriate GI sequence which is different than a random sequence, and a number of chips within a GI. A GI sequence may include a Golay sequence, for example. Security parameters 320*b* may include salt and share key, and a number of random sequences (RSs) that are used to derive the RSs. The setup and negotiation phase may also include additional rules. For example, the number of random sequences used may be less than or equal to the number of random sequences requested by the Initiator.

At 330, the protection establishment phase, the Initiator and Responder exchange request to send (RTS) and directional multi gigabit (DMG) clear to send (CTS) messages to reduce the probability of collisions.

Figure 8A:
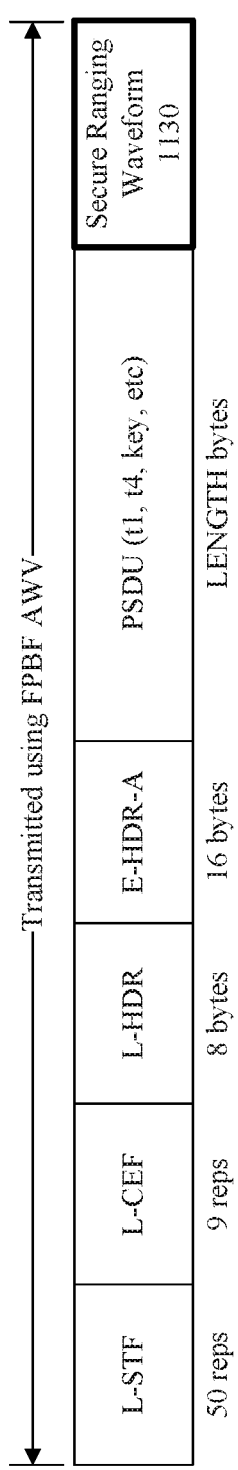
FIGS. 8A-8C illustrate various BF antenna weight vector (AWV) modes, according to some embodiments of the disclosure.
Figure 8B:
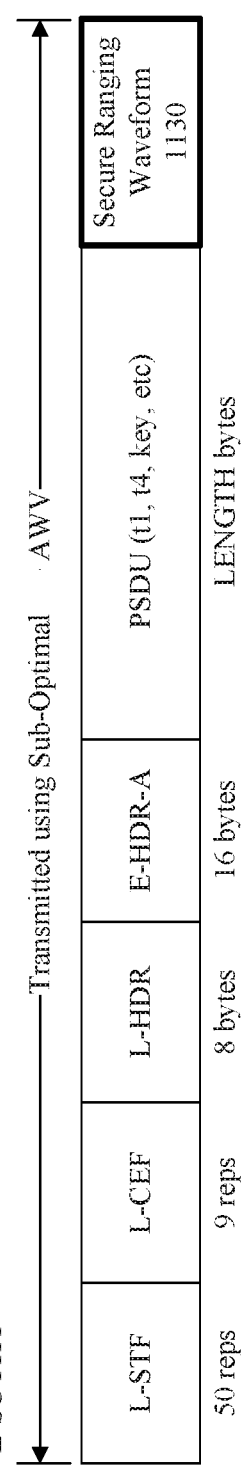
Figure 8C:
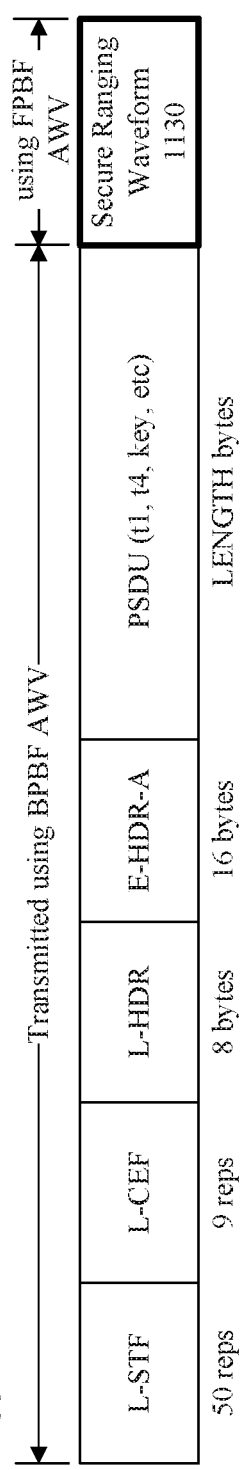

At 340, the secure measurement phase, the Initiator and Responder transmit secure ranging packets and perform measurements according to the AWV mode negotiated at 320. For example, at 340*a*, EDMGz packet 1110 may be transmitted in a hybrid mode where a portion is transmitted with the BPBF AWV and a remaining portion may be transmitted with a FPBF AWV. The portion may include the preamble+header+data, and the remaining portion may include secure ranging waveform 1130 as shown in FIG. 8C. The EDMGz packet 1110 is received accordingly, and measurements are determined.

At 340*b*, the Initiator and Responder transmit secure ranging packets and perform measurements according to the FPBF AWV mode selected. For example, an entire EDMGz packet 1110 may be transmitted with a FPBF AWV as shown in FIG. 8A. The EDMGz packet 1110 is received accordingly, and measurements are determined.

At 340*c*, the Initiator and Responder transmit secure ranging packets and perform measurements according to the Sub-Optimal AWV mode selected. For example, an entire EDMGz packet 1110 may be transmitted with a Sub-Optimal AWV as shown in FIG. 8B. The EDMGz packet 1110 is received accordingly, and measurements are determined.

At 350, the termination phase, Initiator terminates the session and the Responder terminates the session.

Figure 4:
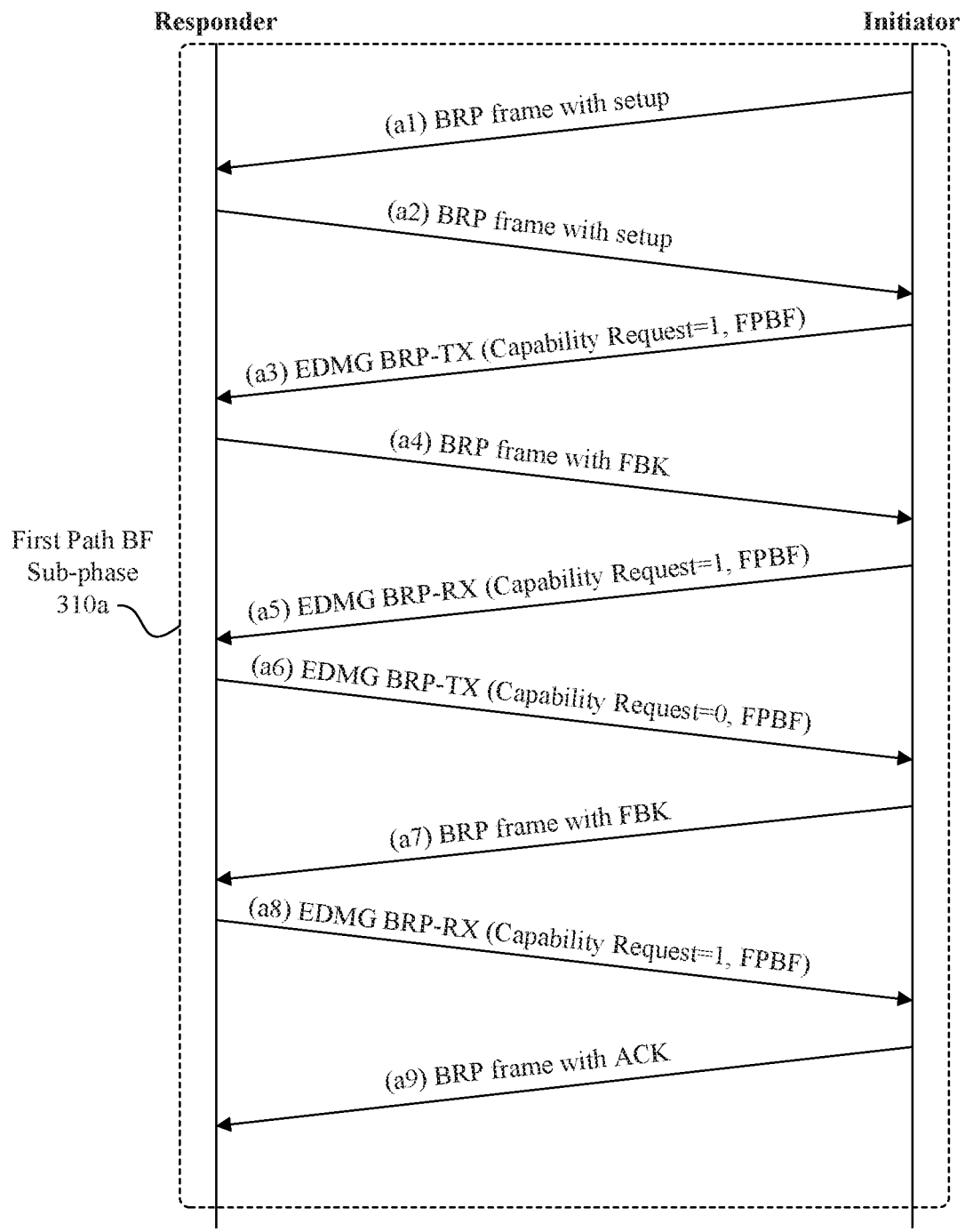
FIG. 4 illustrates an example method for a first path beamforming (FPBF) operation sub-phase without reciprocity, according to some embodiments of the disclosure.

FIG. 4 illustrates an example method 400 for a first path beamforming (FPBF) operation sub-phase 310*a* of FIG. 3, according to some embodiments of the disclosure. As a convenience and not a limitation, method 400 may be described with regard to elements of FIGS. 1, 2, 3, and 5-15. Method 400 assumes there is no reciprocity (e.g., no antenna reciprocity and/or no antenna pattern reciprocity) applied between the Initiator and the Responder, where the Initiator and the Responder are the initiating station and responding station as described for FIG. 3. As a link has already been established, a BPBF AWV has been determined. Accordingly, the FPBF training operation is applied to determine a FP, the shortest FAP.

The Initiator transmits 400(*a*1) frame that includes a BRP frame with setup information that includes a FPBF transmit training request. The information may include for example, the number of antennas that the Initiator has, the number of TRN subfields to use, etc.

The Responder receives 400(*a*1) frame and in response, transmits 400(*a*2) frame that includes a BRP frame with setup information that includes a confirmation of the FPBF transmit training request, and may include the number of antennas that the Responder has, a number of TRN subfields to use, etc.

The Initiator receives the confirmation 400(*a*2) frame from the Responder.

In response to receiving 400(*a*2) frame, the Initiator performs an Initiator first path transmit training (FPTXT) operation sub-phase by transmitting 400(*a*3). During the Initiator FPTXT operation, the Initiator transmits a number of EDMG BRP-TX packets consecutively using the Initiator's first antenna to the Responder's first antenna, and repeats the transmission of the EDMG BRP-TX packets consecutively using the Initiator's second antenna to the Responder's first antenna, and so on. After the Initiator has repeated the transmission of the EDMG BRP-TX packets consecutively using the Initiator's last antenna to the Responder's first antenna, the Initiator repeats the transmission of the EDMG BRP-TX packets consecutively, starting again with the Initiator's first antenna to the Responder's second antenna, and so on until the transmission of the EDMG BRP-TX packets consecutively using each of the Initiator's antennas to each of the Responder's antennas is complete.

The Responder receives at each of the Responder's antennas, the various consecutive transmissions of the EDMG BRP-TX packets from each of the Initiator's antennas. The Responder determines based on the EDMG BRP-TX packets received, which of the Responder's antennas received the FP measurement (e.g., the signal with the shortest FAP.) For example, the Responder may determine the FP measurement based at least on the TRN field of the consecutive transmissions of the EDMG BRP-TX received. In addition, the Responder determines which of the Initiator's antennas transmitted the packet from which the FP measurement was determined, and the corresponding antenna weight vector (AWV) that the Initiator used to transmit the packet associated with the FP measurement.

The Responder transmits 400(a4) that includes a BRP frame with feedback (FBK). The feedback to the Initiator FPTXT operation includes the Initiator's FP antenna and the corresponding FPBF AWV associated with the FP measurement. The Initiator receives the feedback of 400(a4).

The Initiator performs a Responder FP receive training (FPRXT) sub-phase by transmitting 400(a5) that includes an EDMG BRP—RX packet using the FPBF AWV and the FP antenna identified in the feedback to the preceding Initiator FPTXT operation. The Responder prepares to receive and receives, via the FP Responder antenna corresponding to the FP measurement transmission during the preceding Initiator FPTXT operation sub-phase, an TRN field from the Initiator.

The Responder performs a Responder FPTXT operation sub-phase by transmitting 400(a6). During the Responder FPTXT operation, the Responder transmits a number of EDMG BRP-TX packets consecutively using the Responder's first antenna to the Initiator's first antenna, and repeats the transmission of the EDMG BRP-TX packets consecutively, using the Responder's second antenna to the Initiator's first antenna, and so on. After the Responder has repeated the transmission of the EDMG BRP-TX packets consecutively using the Responder's last antenna to the Initiator's first antenna, the Responder repeats the transmission of the EDMG BRP-TX packets consecutively, starting again with the Responder's first antenna to the Initiator's second antenna, and so on until the transmission of the EDMG BRP-TX packets consecutively using each of the Responder's antennas to each of the Initiator's antennas is complete.

The Initiator receives at each of the Initiator's antennas, the various consecutive transmissions of the EDMG BRP-TX packets from each of the Responder's antennas. The Initiator determines based on the EDMG BRP-TX packets received, which of the Initiator's antennas received the FP measurement (e.g., signal with the shortest FAP). For example, the Initiator may determine the best first path measurement based at least on the TRN field (e.g., Secure Ranging Waveform) of the consecutive transmissions of the EDMG BRP-TX received. In addition, the Initiator determines which of the Responder's antennas transmitted the packet from which the FP measurement was determined, and the corresponding antenna weight vector (AWV) that the Responder used to transmit the packet associated with the FP measurement.

The Initiator transmits 400(a7) that includes a BRP frame with feedback (FBK). The feedback to the Responder FPTXT operation includes the Responder's first path antenna and the corresponding first path AWV associated with the FP measurement. The Responder receives the feedback of 400(a7).

The Responder performs an Initiator FPRXT sub-phase by transmitting 400(a8) that includes an EDMG BRP—RX packet using the first path AWV and the first path antenna identified in the feedback to the preceding Responder FPTXT operation. The Initiator prepares to and receives, via the first path Initiator antenna corresponding to the FP measurement transmission during the preceding Responder FPTXT operation sub-phase, a TRN field (e.g., Secure Ranging Waveform) from the Initiator.

The Initiator transmits an acknowledgement sub-phase at frame 400(a9).

Figure 5:
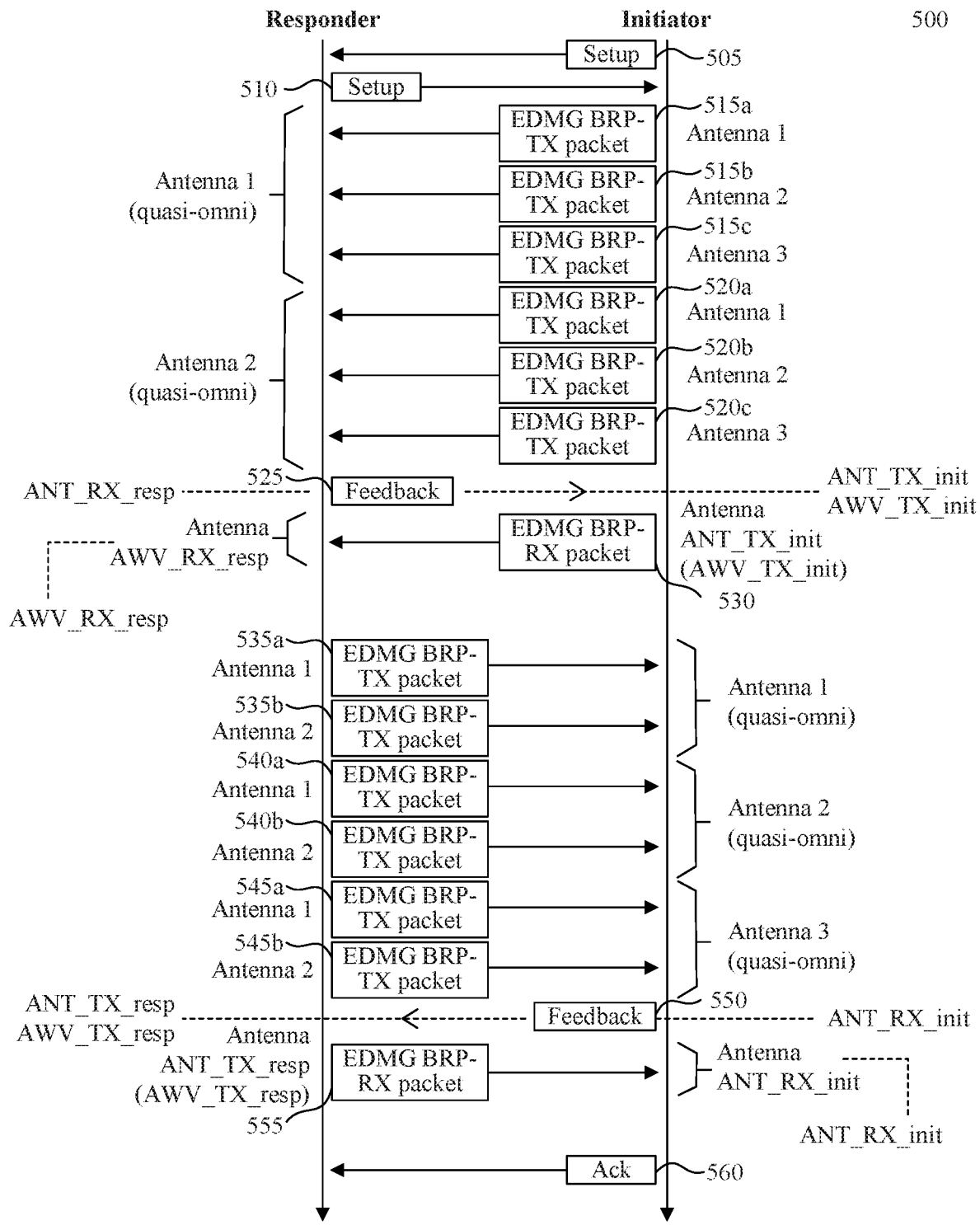
FIG. 5 illustrates a more detailed example method for a FPBF operation sub-phase without reciprocity, according to some embodiments of the disclosure.

FIG. 5 illustrates a more detailed example method 500 for a FPBF operation sub-phase 310a without reciprocity, according to some embodiments of the disclosure. As a convenience and not a limitation, method 500 may be described with regard to elements of FIGS. 1, 2, 3, 4, and 6-15. Method 500 assumes there is no reciprocity (e.g., no antenna reciprocity and/or no antenna pattern reciprocity) applied between the Initiator and the Responder, where the Initiator and the Responder are the initiating station and responding station as described for FIG. 3. Accordingly, the FPBF training operation is applied to a transmitter (e.g., Initiator) and to a receiver (e.g., Responder.)

In this example, the Initiator has 3 antennas and the Responder has 2 antennas.

At 505, method 500 illustrates the transmission and reception of FPBF setup request information of 400(a1). During the pre-condition a link has been established between the Initiator and the Responder, thus a BP has been established for transmitting data. The FPBF setup information may be transmitted utilizing BPBF AWV and corresponding BP antennas.

At 510, method 500 illustrates the transmission and reception of confirmation FPBF setup information of 400(a2). The setup information may be transmitted utilizing BPBF AWV and corresponding BP antennas.

At 515 and 520, method 500 illustrates the Initiator FPTXT operation of 400(a3). For example, at 515a, Initiator antenna 1 may transmit a number of EDMG BRP-TX packets consecutively to Responder antenna 1. Responder antenna 1 receives the packets and determines the FP. Note that the algorithm for determining the FP may be different than the algorithm for determining the BP, but the hardware is the same.

At 515b, Initiator antenna 2 may transmit a number of EDMG BRP-TX packets consecutively to Responder antenna 1. Responder antenna 1 receives these packets and determines the FP.

At 515c, Initiator antenna 3 may transmit a number of EDMG BRP-TX packets consecutively to Responder antenna 1. Responder antenna 1 receives these packets and determines the FP.

At 520a, Initiator antenna 1 may transmit a number of EDMG BRP-TX packets consecutively to Responder antenna 2. Responder antenna 2 receives these packets and determines the FP.

At 520b, Initiator antenna 2 may transmit a number of EDMG BRP-TX packets consecutively to Responder antenna 2. Responder antenna 2 receives these packets and determines the FP.

At 520c, Initiator antenna 3 may transmit a number of EDMG BRP-TX packets consecutively to Responder antenna 2. Responder antenna 2 receives these packets and determines the FP.

The Responder determines based on the EDMG BRP-TX packets received, which of the Responder's antennas (1 or 2) received the FP measurement (e.g., a signal with the shortest FAP.) In this example Responder antenna 2 is ANT_RX_resp, the FP Responder antenna. The Responder also determines which of the Initiator's antennas (1, 2, or 3) transmitted the packet from which the FP measurement was determined, and the corresponding AWV that the Initiator used to transmit the packed associated with the FP measurement. In this example, the Initiator antenna 3 is ANT_TX_init, the FP Initiator antenna, and the corresponding AWV_TX_init is the FPBF AWV.

At 525, method 500 illustrates 400(a4). For example, the Responder transmits via Responder antenna 2, the ANT_RX_resp, a BRP frame with feedback to the Initiator FPTXT operation that includes Initiator antenna 3 as the ANT_TX_init, the first path Initiator antenna and AWV_TX_init, the FPBF AWV. The feedback is received by the Initiator.

At 530, method 500 illustrates 400(a5). For example, the Initiator performs Responder FPRXT sub-phase by transmitting EDMG BRP—RX packet to the Responder using FP Initiator antenna 3, ANT_TX_init, and the FPBF AWV, AWV_TX_init. The Responder prepares and receives the EDMG BRP—RX packet via FP Responder antenna 2, ANT_RX_resp.

At 535, 540, and 545, method 500 illustrates the Responder FPTXT operation of 400(a6). For example, at 535a, Responder antenna 1 may transmit a number of EDMG BRP-TX packets consecutively to Initiator antenna 1. Initiator antenna 1 receives the packets and determines the FP. Note that the algorithm for determining the FP may be different than the algorithm for determining the BP, but the hardware is the same.

At 535b, Responder antenna 2 may transmit a number of EDMG BRP-TX packets consecutively to Initiator antenna 1. Initiator antenna 1 receives these packets and determines the FP.

At 540a, Responder antenna 1 may transmit a number of EDMG BRP-TX packets consecutively to Initiator antenna 2. Initiator antenna 2 receives these packets and determines the FP.

At 540b, Responder antenna 2 may transmit a number of EDMG BRP-TX packets consecutively to Initiator antenna 2. Initiator antenna 2 receives these packets and determines the FP.

At 545a, Responder antenna 1 may transmit a number of EDMG BRP-TX packets consecutively to Initiator antenna 3. Initiator antenna 3 receives these packets and determines the FP.

At 545b, Responder antenna 1 may transmit a number of EDMG BRP-TX packets consecutively to Initiator antenna 3. Responder antenna 3 receives these packets and determines the FP.

The Initiator determines based on the EDMG BRP-TX packets received, which of the Initiator's antennas (1, 2, or 3) received the FP measurement (e.g., signal with the shortest FAP.) In this example Initiator antenna 1 is the ANT_RX_init, the FP Initiator antenna. The Initiator also determines which of the Responder's antennas (1 or 2) transmitted the packet from which the FP measurement was determined, and the corresponding AWV that the Responder used to transmit the packed associated with the FP measurement. In this example, the Responder antenna 1 is ANT_TX_resp, the FP Responder antenna, and the corresponding AWV_TX_resp is the FP beam forming (FPBF) AWV.

At 550, method 500 illustrates 400(a7). For example, the Initiator transmits via Initiator antenna 1, the ANT_RX_init, a BRP frame with feedback to the Responder FPTXT operation that includes Responder antenna 1 as ANT_TX_resp, the FP Responder antenna and AWV_TX_resp, the FPBF AWV. The feedback is received by the Responder.

At 555, method 500 illustrates 400(a8). For example, the Responder performs Initiator FPRXT sub-phase by transmitting EDMG BRP—RX packet to the Initiator using FP Responder antenna 1 and the FPBF AWV. The Initiator prepares and receives the EDMG BRP—RX packet via FP Initiator antenna 1.

At 560, method 500 illustrates 400(a9) where the Initiator transmits an acknowledgement sub-phase.

Figure 6:
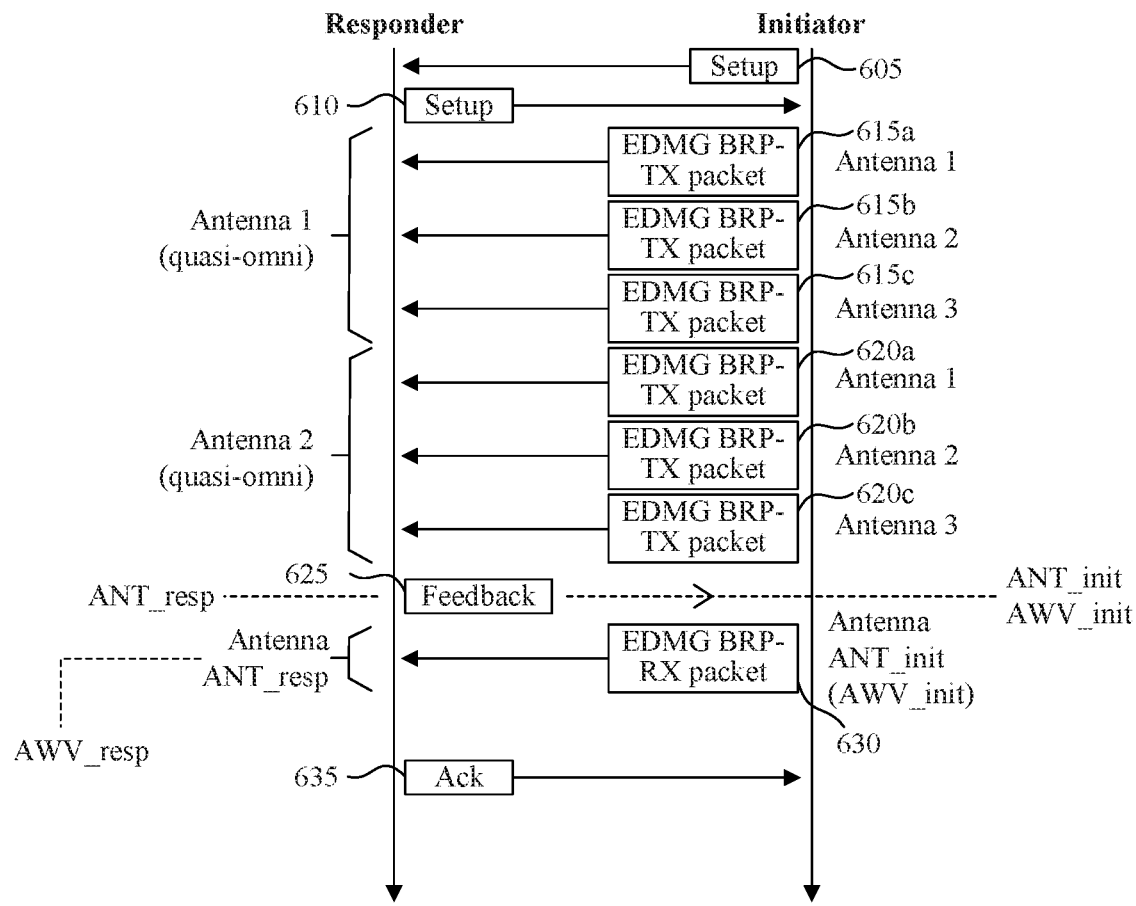
FIG. 6 illustrates an example method for a FPBF operation phase with reciprocity, according to some embodiments of the disclosure.

FIG. 6 illustrates an example method 600 for a FPBF operation phase with reciprocity, according to some embodiments of the disclosure.

Method 600 assumes there is reciprocity (e.g., antenna reciprocity and/or antenna pattern reciprocity) applied between the Initiator and the Responder. Accordingly, method 600 is a shortened version of method 500. For example, transmission and reception 605 and 610 are equivalent to 505 and 510 of FIG. 5. Antennas 615a-615c and 620a-620c and their transmissions are equivalent to antennas 515a-515c and 520a-520c and their transmissions. Feedback 625 is equivalent to feedback 525. Further, transmitting EDMG BRP—RX packet at 630 is equivalent to 530. Method 600 at 635 illustrates 400(a9) where the Responder transmits an acknowledgement sub-phase.

Figure 7:
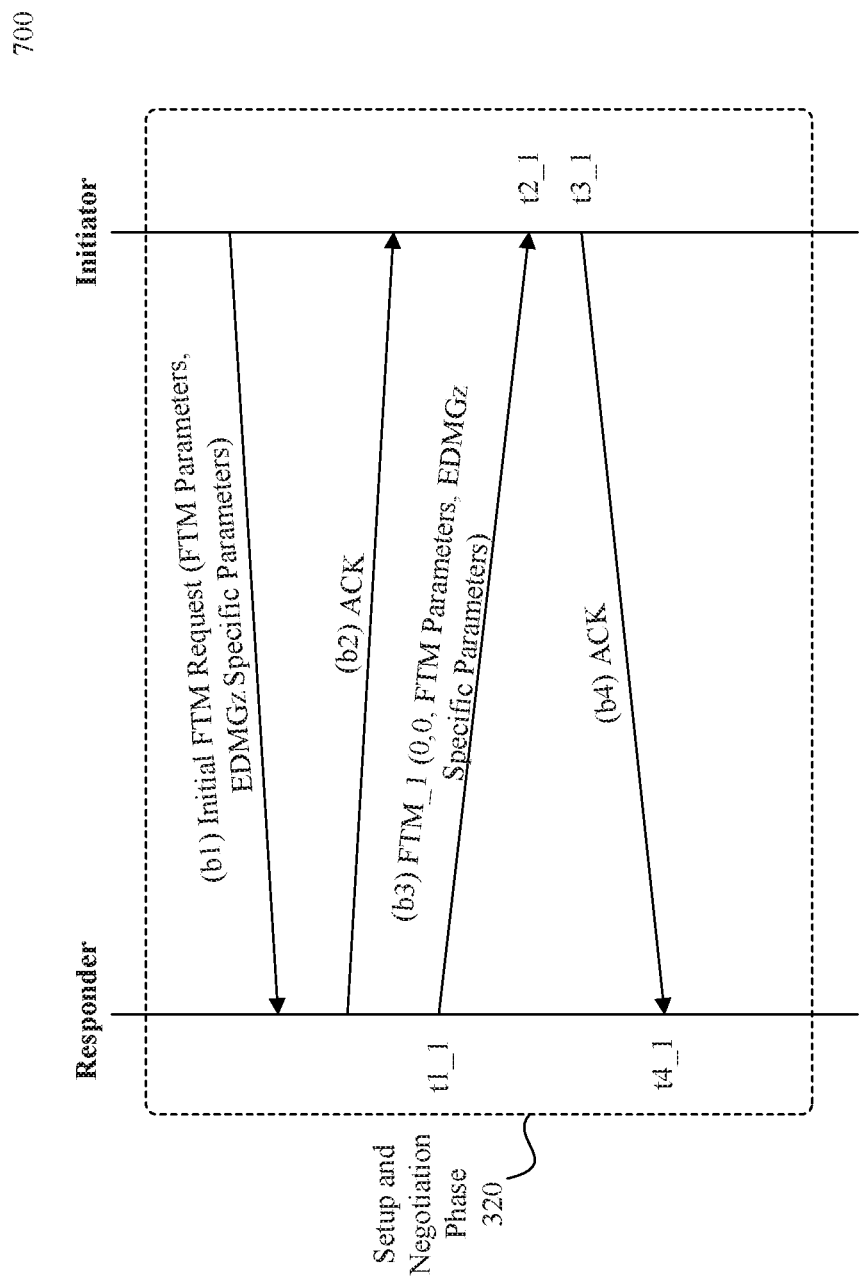
FIG. 7 illustrates an example method for a setup and negotiation phase, according to some embodiments of the disclosure.

FIG. 7 illustrates an example method 700 for a setup and negotiation phase 320 as described in FIG. 3, according to some embodiments of the disclosure. Method 700 may be performed by an Initiator and Responder devices that may include wireless ranging system 200 of FIG. 2 and/or computer system 1500.

At (b1), the Initiator may transmit an initial FTM Request that includes for example, FTM parameters and EDMGz specific parameters. Examples of EDMGz specific parameters include but are not limited to operation parameters 320a and security parameters 320b of FIG. 3. An example of a secure FTM request frame format for signal (b1) is illustrated below in FIG. 9A.

At (b2), the Responder may transmit an acknowledgment after receiving (b1).

At (b3), the Responder may transmit a FTM Request that includes for example, FTM parameters and EDMGz specific parameters. An example of a secure FTM request frame format for signal (b3) is illustrated below in FIG. 9A.

At (b4), the Initiator may transmit an acknowledgment after receiving (b3).

FIGS. 8A-8C illustrate various BF antenna weight vector (AWV) modes 800, 835, and 870, according to some embodiments of the disclosure. BF AWV mode 800 illustrates the FPBF AWV mode. Some embodiments use the FPBF AWV mode throughout EDMGz packet 1110 for SToF measurements in scenarios where the FPBF is robust. For example, the FP may have a S/N ratio of at least 4-5 dB. Examples of these conditions include when a pencil beam or high gain beam is formed between the transmitter and receiver on the FAP. The S/N ratio is sufficient to enable Single-Carrier PHY operation in low modulating and coding scheme (MCS) values. In the FPBF AWV mode the TRN field (e.g., secure ranging waveform 1130) may be transmitted using the FPBF AWV to fine tune the estimation of the FAP.

BF AWV mode 835 illustrates the sub-optimal AWV mode. Some embodiments use a sub-optimal path AWV mode throughout EDMGz packet 1110 for SToF measurements. The sub-optimal path AWV mode may be a combination of the at least the BPBF AWV and the FPBF AWV. For example, the transmit power may be equally pointed to or distributed in a known proportion to both directions of the BP and the FP, where no additional training is needed. The transmitter may allocate different power across the two pointing directions (e.g., the BP and the FP) where additional signaling is needed. The sub-optimal path AWV mode may provide a tradeoff between the BP and the FP with degraded FAP accuracy, but improved S/N ratio (thus higher MCS) to correctly decode the EDMGz packet (e.g., secure ranging packet.)

BF AWV mode 870 illustrates the Hybrid AWV mode. Some embodiments use a hybrid path AWV mode to transmit EDMGz packet 1110 for SToF measurements that use the BPBF AWV for transmitting some fields and the FPBF AWV for transmitting other fields. For example, the L-STF, L-CEF, L-HDR, E-HDR and payload fields are transmitted using the BPBF AWV, and Secure Ranging Waveform 1130 is transmitted using the FPBF AWV.

FIGS. 9A-9F illustrate an example secure FTM request frame format 900 and field formats 910, 920, 930, 940, and 950, according to some embodiments of the disclosure. For example, the (b1) and (b3) FTM request signals of FIG. 7 may be in the form of secure FTM request frame format 900 that is shown in FIG. 9A. Secure FTM request frame format 900 may include EDMGz specific parameters 910 as shown in FIG. 9B that includes subset of EDMG capabilities 920, secure ranging parameters subelement 930, and EDMG direction measurement subelement 918 fields.

FIG. 9C shows EDMG capabilities 920 that includes bandwidth 922 and antenna 924, for example. FIG. 9D shows secure ranging parameters subelement 930 that may include ranging operation parameters 940 and secure ranging parameters 950. FIG. 9E shows ranging operation parameters 940 that includes number of RSs 942, phase tracking 946, and First/Sub-optimal AWV 948 fields. FIG. 9F shows secure ranging parameters 950 that include secret key 952 and salt 956 fields.

Figure 10:
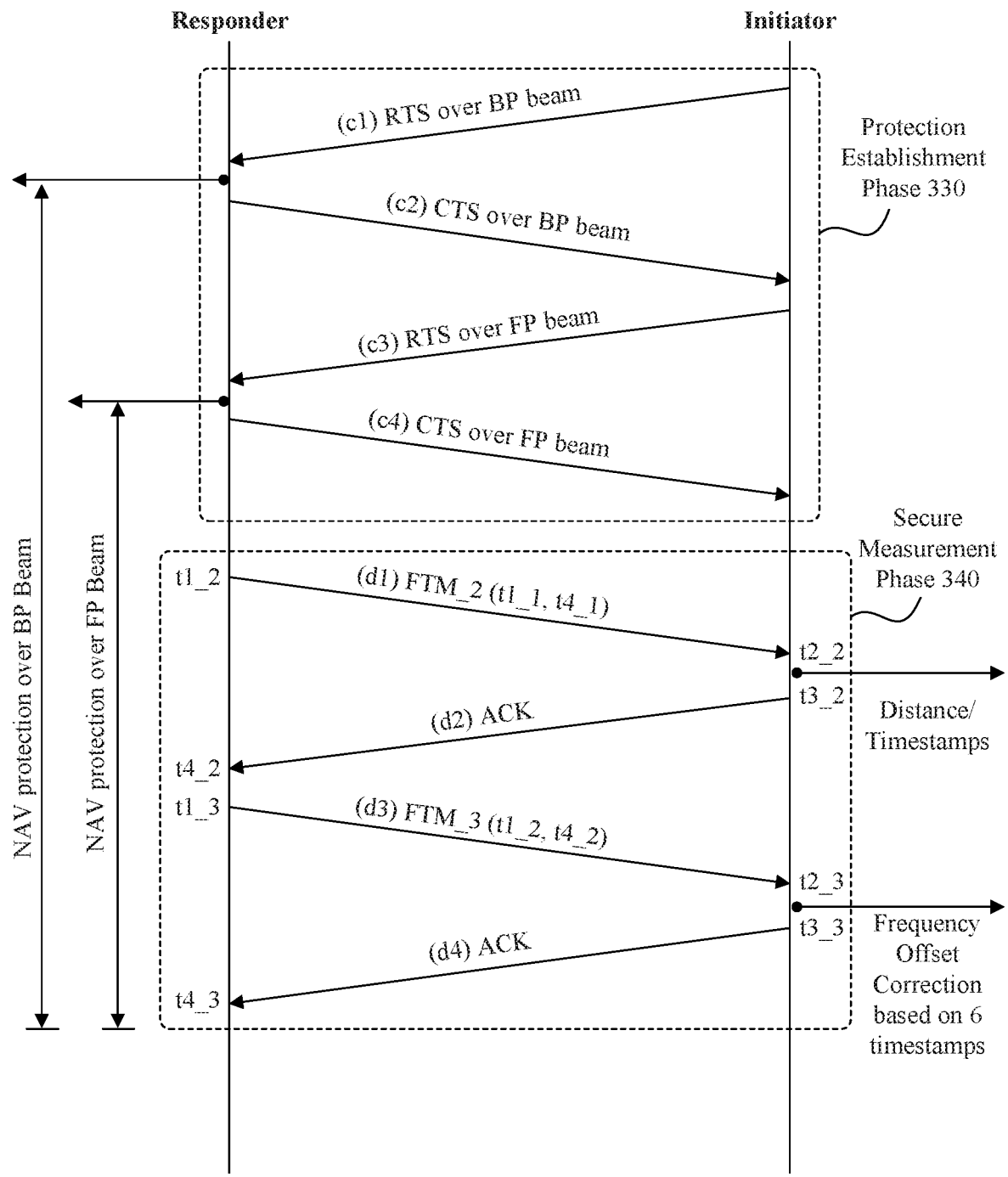
FIG. 10 illustrates an example method for a protection establishment phase and a secure measurement phase, according to some embodiments of the disclosure.

FIG. 10 illustrates an example method 1000 for a protection establishment phase 330 and a secure measurement phase 340, according to some embodiments of the disclosure. Method 1000 may be performed by an Initiator and Responder devices that may include wireless ranging system 200 of FIG. 2 and/or computer system 1500. For example, when a FPBF AWV mode is selected during the negotiation phase 320 (e.g., a value of the First/Sub-Optimal AWV field 948 is set to "1", then a single RTS/DMG CTS frame exchange (e.g., (c3) and (c4)) may be performed (e.g., (c1) and (c2) are not performed.) For example, at (c3) the RTS frame may be transmitted by the Initiator using the Initiator FP transmit AWV. The Initiator FP transmit AWV may be the Initiator FPBF AWV. The Responder may transmit at (c4) the CTS using the Responder FP transmit AWV which may be the Responder FPBF AWV. Note that the Initiator and Responder have their own FPBF AWVs. When a Sub-optimal AWV mode is selected by the Initiator during the negotiation phase (e.g., a value of the First/Sub-Optimal AWV field 948 is set to "2", a single RTS/DMG CTS frame exchange (not shown) may be performed. The RTS frame may be transmitted by the Initiator using the Initiator's Sub-Optimal Transmit AWV and the DMG CTS frame may be transmitted by the Responder using the Responder's Sub-Optimal transmit AWV. If a hybrid mode AWV is selected by the Initiator during the negotiation phase (e.g., a value of the First/Sub-Optimal AWV field 948 is set to "3", two RTS/DMG CTS frame exchanges may be performed (e.g., (c1)-(c4)). The first RTS frame (c1) may be transmitted by the Initiator using the Initiator's BP transmit AWV (e.g., the Initiator's BPBF AWV), and the first DMG CTS frame (c2) may be transmitted by the Responder using the Responder's BP transmit AWV (e.g., the Responder's BPBF AWV). The second RTS frame (c3) may be transmitted by the Initiator using the Initiator's FPBF AWV and the second DMG CTS frame (c4) may be transmitted by the Responder using the Responder's FPBF AWV. In the cases above, the RTS/DMG CTS exchange duration may cover the entire secure measurement phase 340 as shown by the respective network allocation vector (NAV) protection over BP beam and over FP beam. Stations listening on the wireless medium receive a transmission time (e.g., a duration field) and set their NAV accordingly to defer accessing the wireless medium.

Secure measurement phase 340 illustrates the exchange of EDMGz packet 1110 based on the operation and security parameters negotiated during 320. The result is a SToF range measurement that is accurate and supports high precision ranging use cases, even at higher frequency bands.

During secure measurement phase 340 additional rules support the various BF AWV modes negotiated in the setup and negotiation phase. For example, when the Initiator chooses a BF AWV mode, the Responder will also choose the same BF AWV mode. When the Initiator transmits an acknowledgement frame to the Responder, the FPBF AWV may be used regardless of the type of BF AWV mode selected (e.g., regardless of the value of the First/Sub-Optimal Path AWV field.)

Figure 15:
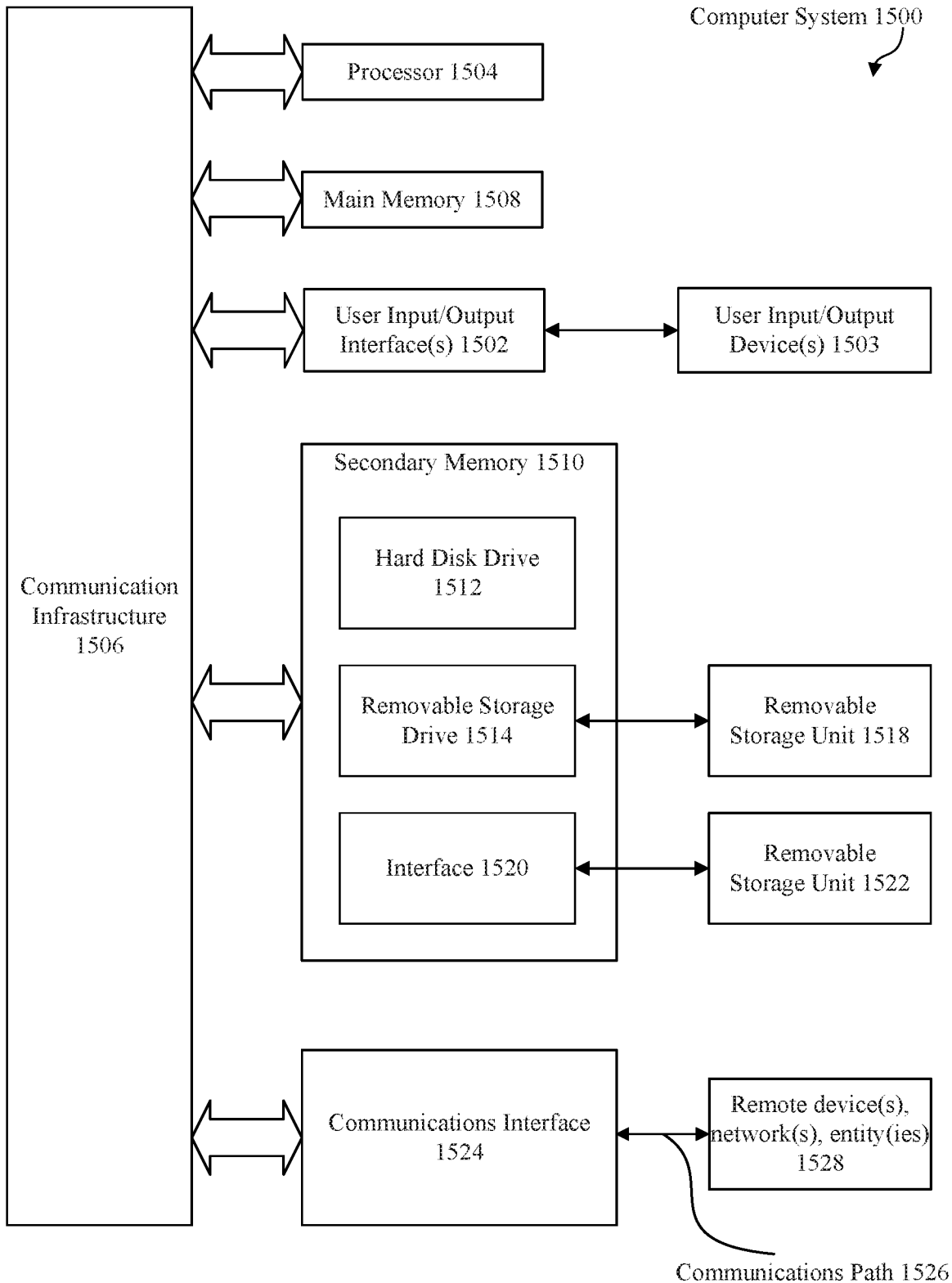
FIG. 15 is an example computer system for implementing some embodiments or portion(s) thereof.

Various embodiments can be implemented, for example, using one or more computer systems, such as computer system 1500 shown in FIG. 15. Computer system 1500 can be any well-known computer capable of performing the functions described herein. For example, and without limitation, electronic devices such as laptops, desktops as described with regard to FIG. 1 and/or other apparatuses and/or components shown in the figures. The laptops and desktops or other wireless devices may include the functions as shown in system 200 of FIG. 2 and/or some or all of methods 400, 500, 600, and 700 of FIGS. 4-7, respectively. For example, computer system 1500 can be used in wireless devices to exchange secure ranging packet structures such as EDMGz packet 1110 that include secure ranging waveform 1130 that enable secure channel estimation between wireless devices.

Computer system 1500 includes one or more processors (also called central processing units, or CPUs), such as a processor 1504. Processor 1504 is connected to a communication infrastructure or bus 1506. Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some embodiments, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 15. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
a memory;
one or more processors coupled to the memory, wherein the one or more processors are configured to:
 establish a link with a second electronic device;
 transmit a first path (FP) antenna weight vector (AWV) based at least on an FP beamforming (BF) operation with the second electronic device;
 receive a secure ranging packet based at least on an AWV mode, wherein the AWV mode is based at least on the FP AWV transmitted;
 perform phase tracking utilizing a first guard interval (GI) and a second GI indicated in the secure ranging packet; and
 securely determine a distance between the electronic device and the second electronic device based at least on the phase tracking.

2. The electronic device of claim 1, wherein the one or more processors are further configured to negotiate one or more operation parameters or security parameters with the second electronic device.

3. The electronic device of claim 2, wherein to negotiate the one or more operation parameters, the one or more processors are configured to:
 transmit an indication to use phase tracking; and
 transmit a random sequence (RS).

4. The electronic device of claim 3, wherein the indication to use phase tracking comprises at least one of: a GI code, a GI index, or a GI sequence.

5. The electronic device of claim 1, wherein the one or more processors are further configured to select the first GI from a plurality of known GIs.

6. The electronic device of claim 1, wherein the secure ranging packet comprises a secure ranging waveform field that includes a zero-padded random sequence (RS) waveform.

7. The electronic device of claim 6, wherein the zero-padded RS waveform comprises: the first GI, the second GI, and an RS.

8. The electronic device of claim 6, wherein the one or more processors are further configured to:
calculate a correlation between the first GI and the second GI;
estimate a common phase shift between the first GI and the second GI based at least on the correlation; and
adjust an RS based at least on the estimated common phase shift.

9. The electronic device of claim 1, wherein the AWV mode comprises an FPBF AWV mode, and wherein one or more fields of the secure ranging packet are received based at least on the FPBF AWV.

10. The electronic device of claim 9, wherein:
the AWV mode comprises a hybrid BF AWV mode;
at least one field of the secure ranging packet is received from a first direction based at least
on a best path beamforming (BPBF) AWV; and
at least one other field of the secure ranging packet is received from a second direction
based at least on the FPBF AWV.

11. The electronic device of claim 1, wherein:
the AWV mode is a sub-optimal AWV mode; and
the secure ranging packet is received based at least on the sub-optimal AWV mode, which comprises a combination of the FPBF AWV and a best path beamforming (BPBF) AWV.

12. The electronic device of claim 1, wherein to perform the FPBF operation, the one or more processors are configured to:
initiate a first path transmit training (FPTXT) operation with the second electronic device; and
receive, from the second electronic device, feedback that indicates an FP transmit antenna of the electronic device or an FPBF AWV associated with the electronic device.

13. The electronic device of claim 1, wherein the one or more processors are further configured to update a best path beamforming (BPBF) AWV based at least on the FPBF operation performed with the second electronic device.

14. A method for transmitting a secure ranging packet with a secure ranging waveform that enables secure time of flight (SToF) determination, comprising:
establishing, by an electronic device, a link with a second electronic device;
transmitting a first path (FP) antenna weight vector (AWV) based at least on a first path (FP) beamforming (BF) operation with the second electronic device;
negotiating one or more phase tracking parameters with the second electronic device;
receiving a secure ranging packet based at least on an AWV mode, wherein the AWV mode
is based at least on the FP AWV transmitted;
performing phase tracking utilizing a first guard interval (GI) and a second GI indicated in the secure ranging packet, wherein the first GI comprises a phase tracking parameter; and
estimating a distance between the electronic device and the second electronic device based at least on the phase tracking.

15. The method of claim 14, wherein the negotiating comprises:
transmitting an indication to use phase tracking; and
transmitting a random sequence (RS).

16. The method of claim 15, wherein the indication to use phase tracking comprises at least one of: a GI code, a GI index, or a GI sequence.

17. The method of claim 14, further comprising selecting the first GI from a plurality of known GIs.

18. The method of claim 17, wherein the secure ranging packet comprises a zero-padded random sequence (RS) waveform that includes the first GI, the second GI, and an RS.

19. The method of claim 18, further comprising:
calculating a correlation between the first GI and the second GI;
estimating a common phase shift between the first GI and the second GI based at least on the correlation; and
adjusting the RS based at least on the estimated common phase shift.

20. A non-transitory computer-readable medium storing instructions that, when executed by a processor of a first electronic device, cause the processor to perform operations comprising:
establishing a link with a second electronic device;
transmitting a first path (FP) antenna weight vector (AWV) based at least on an FP beamforming (BF) operation with the second electronic device;
receiving a secure ranging packet based at least on an AWV mode, wherein the AWV mode is based at least on the transmitted FP AWV;
performing phase tracking utilizing a first guard interval (GI) and a second GI indicated in the secure ranging packet, wherein the secure ranging packet comprises a random sequence (RS); and
estimating a distance between the first electronic device and the second electronic device based at least on the phase tracking and the RS.

* * * * *